US011423885B2

(12) United States Patent
Sharifi et al.

(10) Patent No.: US 11,423,885 B2
(45) Date of Patent: Aug. 23, 2022

(54) UTILIZING PRE-EVENT AND POST-EVENT INPUT STREAMS TO ENGAGE AN AUTOMATED ASSISTANT

(71) Applicant: Google LLC, Mountain View, CA (US)

(72) Inventors: Matthew Sharifi, Kilchberg (CH); Tom Hume, San Francisco, CA (US); Mohamad Hassan Mohamad Rom, Zurich (CH); Jan Althaus, Zurich (CH); Diego Melendo Casado, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 223 days.

(21) Appl. No.: 16/349,871

(22) PCT Filed: Feb. 20, 2019

(86) PCT No.: PCT/US2019/018750
§ 371 (c)(1),
(2) Date: May 14, 2019

(87) PCT Pub. No.: WO2020/171809
PCT Pub. Date: Aug. 27, 2020

(65) Prior Publication Data
US 2021/0065693 A1 Mar. 4, 2021

(51) Int. Cl.
G10L 15/18 (2013.01)
G10L 15/22 (2006.01)
G10L 15/08 (2006.01)

(52) U.S. Cl.
CPC .......... G10L 15/1815 (2013.01); G10L 15/22 (2013.01); G10L 2015/088 (2013.01); G10L 2015/223 (2013.01)

(58) Field of Classification Search
CPC ..... G10L 15/22; G10L 15/1815; G10L 15/30; G10L 15/02; G10L 15/07; G10L 15/20;
(Continued)

(56) References Cited

U.S. PATENT DOCUMENTS 10,049,669 B2 8/2018 Newman et al.
10,192,546 B1 1/2019 Piersol et al.
(Continued)

FOREIGN PATENT DOCUMENTS

WO 2015005927 1/2015
WO 2018110818 6/2018

OTHER PUBLICATIONS

Johnston, "Creating a Circular Buffer in C and C++," EmbeddedArtistry.com Blog, May 17, 2017 (available at https://embeddedartistry.com/blog/2017/05/17/creating-a-circular-buffer-in-c-and-c/) (Year: 2017).*
(Continued)

Primary Examiner — Michelle M Koeth
(74) Attorney, Agent, or Firm — Middleton Reutlinger

(57) ABSTRACT

Techniques are described herein for selectively processing a user's utterances captured prior to and after an event that invokes an automated assistant to determine the user's intent and/or any parameters required for resolving the user's intent. In various implementations, respective measures of fitness for triggering responsive action by the automated assistant may be determined for pre-event and a post-event input streams. Based on the respective measures of fitness, one or both of the pre-event input stream or post-event input stream may be selected and used to cause the automated assistant to perform one or more responsive actions.

20 Claims, 12 Drawing Sheets

(58) Field of Classification Search
CPC ......... G10L 15/08; G10L 17/06; G10L 17/00; G10L 17/24; G10L 2015/223; G10L 2015/088; G10L 2021/02166; G10L 25/30; G06F 2203/0381; G06F 1/3206
See application file for complete search history.

(56) References Cited

U.S. PATENT DOCUMENTS

| | | | | |
|---|---|---|---|---|
| 10,482,904 | B1* | 11/2019 | Hardie | G10L 15/22 |
| 10,762,903 | B1* | 9/2020 | Kahan | G10L 15/26 |
| 10,789,041 | B2* | 9/2020 | Kim | G10L 15/20 |
| 2014/0222436 | A1 | 8/2014 | Binder et al. | |
| 2014/0337030 | A1 | 11/2014 | Lee et al. | |
| 2015/0039303 | A1* | 2/2015 | Lesso | G10L 15/20 |
| | | | | 704/233 |
| 2015/0074524 | A1 | 3/2015 | Nicholson et al. | |
| 2017/0068513 | A1 | 3/2017 | Stasior et al. | |
| 2017/0187852 | A1 | 6/2017 | Baek et al. | |
| 2018/0068656 | A1 | 3/2018 | Lehman et al. | |
| 2018/0108343 | A1* | 4/2018 | Stevans | G10L 15/26 |
| 2018/0293221 | A1* | 10/2018 | Finkelstein | G10L 17/10 |
| 2019/0206412 | A1* | 7/2019 | Li | G10L 17/00 |
| 2020/0286628 | A1* | 9/2020 | Helmer | G16H 50/70 |
| 2021/0233556 | A1* | 7/2021 | Kashima | G10L 15/08 |

OTHER PUBLICATIONS

European Patent Office; International Search Report and Written Opinion of Ser. No. PCT/US2019/018750; 14 pages; dated Oct. 2, 2019.

\* cited by examiner

UTILIZING PRE-EVENT AND POST-EVENT INPUT STREAMS TO ENGAGE AN AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input. Automated assistants may perform various types of processing on the natural language input, such as natural language processing, syntactic process, semantic processing, etc., in order to identify and respond to the user's intent.

In many cases, before the automated assistant can interpret and respond to a user's request, it must first be "invoked" in response to various events. In some cases an automated assistant can be invoked in response to a button being operated and/or pressed for some predetermined time period, etc. Additionally or alternatively, some automated assistants may be invoked using predefined oral invocation words/phrases that are often referred to as "hot words" or "wake words." Thus, many automated assistants operate in what will be referred to herein as a "limited hot word listening state" or "inactive listening state" in which they are always "listening" to audio data sampled by a microphone for a limited (or finite, or "default") set of hot words. Any utterances captured in the audio data other than the default set of hot words are ignored. Once the automated assistant is invoked with one or more of the default set of hot words, it may operate in what will be referred to herein as an "active listening state" wherein for at least some time interval after invocation, the automated assistant performs speech-to-text ("STT", also referred to as "automatic speech recognition," or "ASR") processing of audio data sampled by a microphone to generate textual input, which in turn is semantically processed to determine a user's intent (and to resolve that intent).

Operating the automated assistant in the inactive listening state provides a variety of benefits. Limiting the number of hot words being "listened for" allows for conservation of power and/or computing resources. For example, an on-device machine learning model may be trained to generate output that indicates when one or more hot words are detected. Implementing such a model may require only minimal computing resources and/or power, which is particularly beneficial for assistant devices that are often resource-constrained. Storing such a trained model locally on a client device also provides advantages relating to privacy. For example, some users do not want STT/ASR processing to be performed automatically on everything they say within earshot of a computing device operating an automated assistant. Additionally, the on-device model also prevents data indicative of user utterances that are not intended to be processed by the automated assistant from being provided to a semantic processor, which often operates at least in part on the cloud.

Along with these benefits, operating the automated assistant in the limited hot word listening state also presents various challenges. To avoid inadvertent invocation of the automated assistant, hot words are typically selected to be words or phrases that are not often uttered in everyday conversation (e.g., "long tail" words or phrases). However, there are various scenarios in which requiring users to utter long tail hot words before invoking an automated assistant to perform some action can be cumbersome. Some automated assistants may provide an option for a "continued listening" mode after a user utters a command, so that the user need not "reawaken" the automated assistant with hot word(s) before performing a subsequent command. However, transitioning the automated assistant into a continued listening mode means that the automated assistant may be performing far more STT processing for far more utterances, potentially wasting power and/or computing resources. Additionally, and as noted above, some users prefer that only utterances addressed to the automated assistant are STT processed.

SUMMARY

Techniques are described herein for selectively processing a user's utterances captured prior to and after an event that invokes an automated assistant to determine the user's intent and/or any parameters required for resolving the user's intent. Consequently, it is possible, for instance, for the user to provide a spoken utterance—which may include a request, a command, a search query, a question, etc.—prior to invoking the automated assistant. Once the automated assistant is invoked, it can retroactively analyze data indicative of the user's prior spoken utterance—e.g., the recorded raw audio, an embedding generated from the raw audio, output of STT and/or natural language processing based on the raw audio, etc.—to determine the user's intent, and respond accordingly. The use of retroactive analysis can avoid unnecessary processing of utterances which are not ultimately associated with a user request to an automated assistant. In this manner, processing and network overheads may be reduced. Moreover, processing of utterances may be distributed between a local device and one or more remote servers while limiting the networked transmission of utterances not intended for the assistant, thereby improving data security while overcoming the technical limitations in implementing all utterances processing locally.

In various implementations, a memory buffer (also referred to as a "retroactive memory buffer") of a client device at which a user engages with an automated assistant may at least temporarily store some predetermined time interval (e.g., ten seconds) worth of data indicative of sound captured by one or more microphones. In some implementations, the data indicative of the sound captured by the microphone(s) may be written into the retroactive memory buffer in response to various stimuli, such as noise, voices, etc. In some such implementations, if there is little or no ambient sound, no data indicative of sound captured by microphones may be stored in the retroactive memory buffer.

Prior to detection of an event that invokes the automated assistant, the automated assistant may continuously and repeatedly overwrite the retroactive memory buffer. In some implementations the retroactive memory buffer may be a circular memory buffer that is periodically overwritten, e.g., using sliding window techniques, although this is not required. In some implementations, the memory buffer may be configured to store some predetermined time interval's worth of data, such as ten seconds of raw audio, text or other data generated from ten seconds of raw audio, etc. In some implementations, the retroactive memory buffer may temporarily store raw audio data captured by the microphone(s), an embedding generated from the raw audio data, or other intermediate features, such as a spectrogram representation. Additionally or alternatively, in some implementations, rudimentary or even comprehensive ASR/STT processing may be performed on captured raw audio, and the extracted text generated by the ASR/STT processing may be temporarily stored in the retroactive memory buffer. Additionally or alternatively, in some implementations, NLP may be performed on the extracted text, and the output of the NLP, which may include annotated text and/or a user intent, may be temporarily stored in the retroactive memory buffer.

Upon detection of an event that invokes the automated assistant, the automated assistant may transition from the inactive listening state into an "active listening state" in which additional processing is performed on the data temporarily stored in the retroactive memory buffer, which is referred to herein as the "pre-event input stream." Additionally or alternatively, additional processing may be performed on data indicative of sound captured by microphone(s) after occurrence of the event; this data is referred to herein as the "post-event input stream." In various implementations, the pre-event and post-event input streams may each be analyzed to determine respective measures of fitness (or suitability) for triggering responsive action by the automated assistant. Measures of fitness for triggering responsive action by the automated assistant may be determined in various ways.

In some implementations, determining the respective measures of fitness may include determining respective similarity measures between the pre-event and post-event input streams and one or more known command syntaxes. If one of the pre-event and post-event input stream includes text that is syntactically similar to a command, and the other does not, then the one input stream may be selected for further processing, e.g., to cause the automated assistant to take responsive action. For example, the phrase "Turn on the lights" is far more similar syntactically to the command syntax "Turn <off/on> the <device>" than the phrase, "I wonder when the next full moon is?"

Additionally or alternatively, it has been observed that users tend to address automated assistants differently than other humans. The users tend to annunciate more clearly, speak more slowly, speak more loudly, etc. Moreover, when people speak to each other, they may not necessarily speak in the direction of a microphone that is accessible to an automated assistant, and as a consequence, user-to-user utterances may tend to have less clarity and/or more noise than user-to-assistant utterances. Accordingly, in various implementations, determining the respective measures of fitness may include analyzing one or more features of the user's voice, such as cadence, annunciation, volume, tempo, etc. to determine its fitness for triggering responsive action. In some implementations, this may include comparing the one or features of the user's voice to one or more voice features observed from utterances containing commands for automated assistants. In some such implementations this comparison may be implemented by way of a machine learning model that is trained—e.g., using training data comprising utterances labeled as being directed to (or not directed to) an automated assistant—to generate output indicative of whether the input is directed to an automated assistant. For example, the pre-event and post-event input streams may be processed by a machine learning model to generate an output indicative of whether their content is directed to an automated assistant and one or both of the pre-event and post-event input streams may be selected in dependence on the output. In some implementations, visual cues may also be considered to determine whether a person is addressing the automated assistant. For example, if the person is looking at the camera when making an utterance, whatever the person says may be more likely to be considered an invoking event. In some implementations, the machine learning model mentioned earlier or an additional machine learning model may use such visual cues to improve an assessment of likelihood that the utterance is directed towards the assistant.

As noted previously, an automated assistant may be invoked by various events, such as user selection of various input elements and/or one or more hot words/phrases. In some implementations, the audio data captured by the microphone(s) may be monitored, e.g., in real time using a digital signal processor ("DSP"), to detect one or more hot words. Upon detection of the hot word(s), audio data previously stored in the retroactive memory buffer of the client device at which the user is invoking the automated assistant may be analyzed, e.g., alone or in parallel with audio data captured after the event. In some such implementations, the local memory buffer may be a DSP buffer integral with a DSP chip or chipset, although this is not required. When the automated assistant transitions into the active listening state, it may access this DSP buffer to perform, for instance, speech recognition, natural language processing, etc., on the temporarily-stored audio data and identify one or more tokens.

Various hot words or phrases may be used to trigger transition of an automated assistant into the active listening state. In some implementations, some hot word(s) may trigger analysis of both the pre-event and post-event input streams, other hot word(s) may trigger analysis of only the pre-event input stream, and yet other hot word(s) may trigger analysis of only the post-event input stream. In some implementations, there may be no distinction between retroactive and processing.

As a first non-limiting example, in some implementations, particular hot word(s) may trigger the automated assistant to perform additional processing (e.g., ASR, NLP, etc.) on the entire content of the memory buffer, and use the output of this processing to, for instance, perform a search. By extracting entities and other terms/phrases that a user might search for, both "word definitions" and factual searches may be supported. Suppose that a first user in a room says, to a second user, "Hmm, I wonder what parsimonious means?", and the second user then says, "sleuth that." In some implementations, the phrase "sleuth that" may operate as a trigger that causes an automated assistant implemented at least in part on a nearby client device to transition into an active listening state. In the active listening state, the automated assistant may obtain the contents of the retroactive memory buffer (audio data comprising a recording of the first user saying "Hmm, I wonder what parsimonious means?"), process them as described above (e.g., ASR, various NLP and/or entity annotations), and submit the result as a search.

In various implementations, hot word(s) usable to transition an automated assistant into the active listening state may include various cues that help the automated assistant determine which action to take. For example, in some implementations, one or more specific hot word(s) may be used to trigger the automated assistant to create a reminder based on retroactive spoken input contained in the memory buffer. For example, suppose a user says, "I need to get some milk on the way home. Remind me about that." The phrase "Remind me about that" may operate as a trigger to cause the automated assistant to transition into the active listening state and process the user's prior utterance, "I need to get some milk on the way home," into a reminder that will be provided to the user later, e.g., when it is determined (e.g., using a position coordinate trigger) that the user is driving home from work. And it need not be the same user that provides the reminder text and the hot word(s). For example, a first user may say, to a second user (in person and/or over the phone), "Can you get some milk on the way home?" The second user may then say, "Remind me about that," to cause the first user's utterance to be processed into a reminder for the second user to receive at a later, contextually appropriate time.

As another example of cues that can be used by the automated assistant in active listening state, in some implementations, referential keywords such as pronouns, determiners, etc., that are contained in the hot word(s) may be identified and mapped to token(s) extracted from the audio data contained in the memory buffer. For example, if multiple entities are identified in the audio data, then the hot word(s) may be analyzed to determine which entity should be the subject or scope of the responsive action taken by the automated assistant. As one example, suppose a first user says to a second user during a conversation, "Yeah, I think Liz Taylor was married to Richard Burton." Suppose the first or second user then says, "Sleuth her." Of the two entities identified (e.g., using a knowledge graph) in the utterance—Liz Taylor and Richard Burton—only Liz Taylor is female. Accordingly, the resulting search assembled and submitted by the automated assistant may be scoped to Liz Taylor. In various implementations, the other identified entity, Richard Burton, may be ignored or used as a weaker signal to help further scope the search results.

As a general example, suppose a user says, "I'm going to the store. Remind me to pick up some apples." The utterance "I'm going to the store" is stored in the retroactive memory buffer as the pre-event stream, the hot word phrase "Remind me to . . . " is the event that triggers the automated assistant, and the phrase " . . . pick up some apples" is captured following the hot word phrase and constitutes the post-event input stream. The pre-event input stream indicative of the phrase "I'm going to the store" is somewhat ambiguous insofar as it doesn't clearly state what the automated assistant is supposed to do, likely doesn't match any known or common command syntax, and is a statement, rather than a command. Thus, when analyzed by automated assistant, this pre-event statement may yield a user intent such as "directions to store" that has a relatively low confidence measure, and therefore has a relatively low measure of fitness for triggering an automated assistant to take responsive action. Moreover, the trigger phrase "remind me" indicates that a reminder is to be set, and the pre-trigger statement "I'm going to the store" is not a typical reminder phrase; it simply states what the user is going to do. On the other hand, the post-event input stream indicative of the phrase " . . . pick up some apples" is a command, and therefore is more suitable as a reminder. Consequently, the measure of fitness for user intent "Remind me to <pick up some apples>" is greater, and therefore would likely be selected by the automated assistant.

Another example of an event that may invoke an automated assistant into the active listening state is context. As a non-limiting example, some automated assistants may be invoked upon a particular application being launched. For example, an application such as a mapping/navigation application may, when launched, invoke an automated assistant into the active listening state. Consequently, when a user opens the mapping/navigation app, e.g., while driving, the user can then issue commands (e.g., "find directions to the nearest coffee shop") without having to provide any additional inputs, and the automated assistant will respond accordingly.

In various implementations, at least some processing capability, such as ASR, NLP, entity tagging, etc., may be built into the client device itself, so that the onboard processing can be used to attempt to analyze speech without sending potentially sensitive information to an online (i.e. "cloud-based") semantic processor. However, the constrained resources of most client devices may limit the functionality of such onboard capabilities. Additionally or alternatively, the user's utterance may not be clear, e.g., due to background noise, mumbling, accents, limited vocabulary, etc. Thus it still may be necessary in some instances to send audio data (or data indicative thereof, such as an embedding) to the online semantic processor.

Accordingly, in various implementations, automated assistants configured with selected aspects of the present disclosure may be configured to solicit permission from a user (or at least notify the user) that something they said is about to be sent to an online semantic processor, so that the user has a chance to stop that from happening. It also may prevent a user from being startled by receiving natural language output from an automated assistant when none was requested.

For example, in some implementations, the client device on which the automated assistant operates may activate one or more lights (e.g., light emitting diodes) to indicate that something the user said is about to be processed online. Additionally or alternatively, in some implementations, the automated assistant may generate and provide natural language output conveying the request or recording it is about to submit to the online semantic processor, and may even ask the user to confirm this is OK. In some implementations, such notifications may be provided when, for instance, a confidence associated with the detected hot word(s) is below some threshold. If, on the other hand, the confidence measure is above the threshold—indicating the user spoke the hot word(s) clearly and they mapped to known hot word (s)—the user's utterance or data indicative thereof (e.g., an embedding, annotated text, etc.) may be sent to the online semantic processor for resolution.

In some implementations, a method performed by one or more processors is provided that includes: executing an automated assistant in an inactive listening state at least in part on a computing device operated by a user; while in the inactive listening state, detecting an event that triggers transition of the automated assistant from the inactive listening state into an active listening state, wherein first data indicative of sound captured by one or more microphones prior to the event is temporarily stored, as a pre-event input stream, in a memory buffer of the computing device operated by the user; obtaining, as a post-event input stream, second data indicative of sound captured by one or more of the microphones after detecting the event; while in the active listening state, determining respective measures of fitness of the pre-event and post-event input streams for triggering responsive action by the automated assistant; based on the respective measures of fitness, selecting the pre-event input stream or post-event input stream; and causing the automated assistant to perform one or more responsive actions based on the selected input stream.

These and other implementations of technology disclosed herein may optionally include one or more of the following features.

In various implementations, the method may further include monitoring sound captured by one or more of the microphones for one or more hot words, wherein the event that triggers transition of the automated assistant from the inactive listening state into the active listening state comprises detection of one or more of the hot words during the monitoring. In various implementations, the method may further include performing speaker recognition processing on at least a portion of the sound captured by the one or more microphones to determine an identity of the user, wherein transition of the automated assistant from the inactive listening state into the active listening state is further triggered in response to a determination that the identity of the user satisfies one or more criteria.

In various implementations, the one or more criteria may include the identity of the user matching an owner of the computing device. In various implementations, the monitoring may be performed using a digital signal processor integral with the computing device operated by the user. In various implementations, the digital signal processor is integral with a digital signal processing chip, and wherein the memory buffer comprises a digital signal processing buffer onboard the digital signal processing chip. In various implementations, one or more of the hot words is a pronoun, and the method further includes resolving the pronoun to one or more tokens extracted from the selected input stream.

In various implementations, the memory buffer may be a circular memory buffer that is periodically overwritten by newly captured audio data. In various implementations, the memory buffer may be configured to temporarily store audio data captured over a predetermined time interval. In various implementations, determining the respective measures of fitness may include determining respective similarity measures between the pre-event and post-event input streams and one or more known command syntaxes. In various implementations, determining the respective measures of fitness includes analyzing one or more features of the user's voice in one or both of the pre-event and post-event input streams. In various implementations, the analyzing includes comparing the one or more features of the user's voice to one or more voice features observed from utterances containing commands for automated assistants. In various implementations, the analyzing includes applying the one or features of the user's voice as input across a machine learning model, wherein the machine learning model is trained to generate output indicative of whether the input is directed to an automated assistant.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
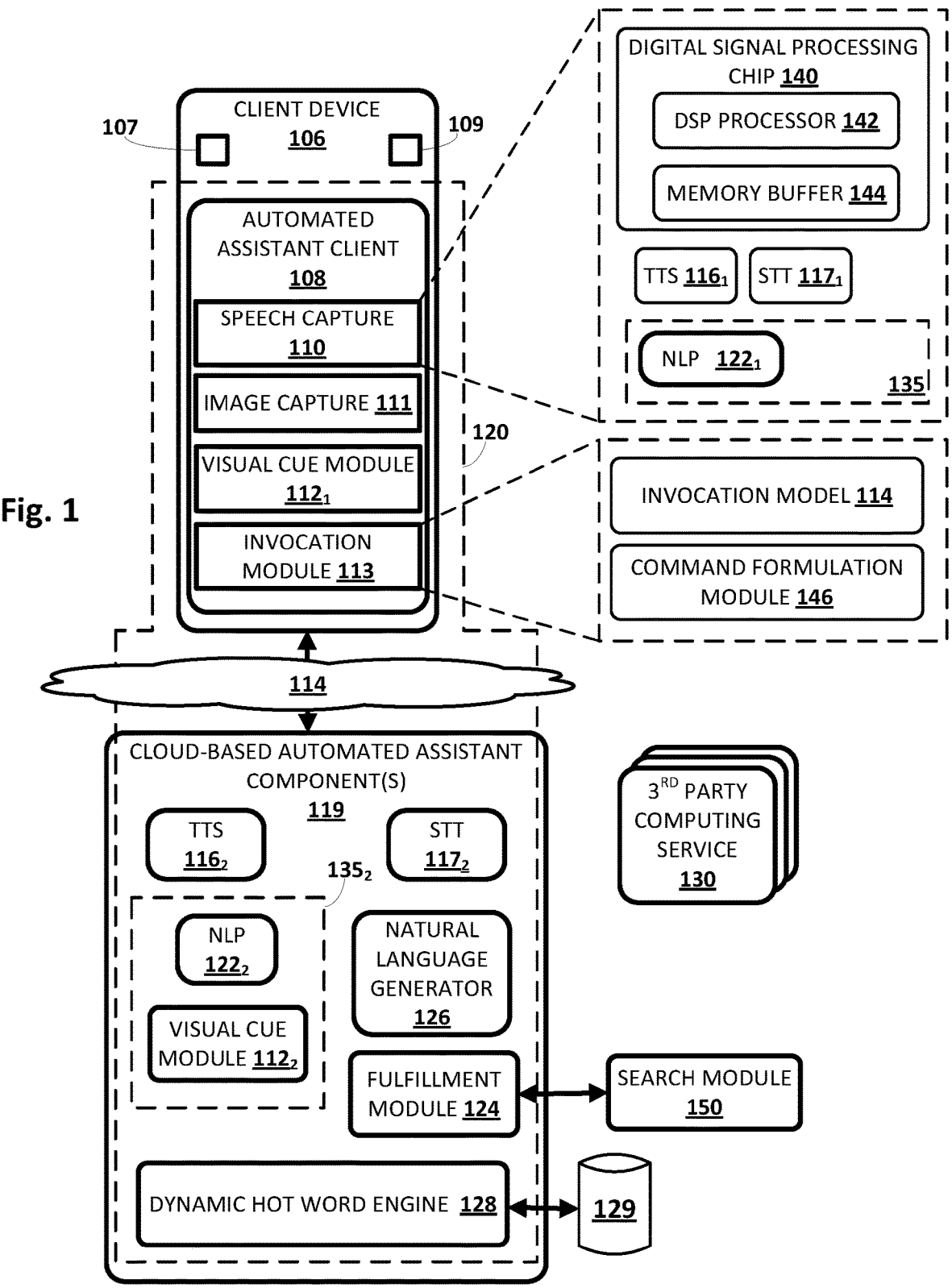
FIG. 1 is a block diagram schematically depicting components of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120, selecting between pre-event and post-event input streams, determining whether an utterance was meant to invoke automated assistant 120 (e.g., based on whether the user was looking at the assistant device when they made the utterance), and/or causing automated assistant 120 to take various actions.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120, which may be "invoked" in response to various "events."

For example, one type of event is detection of a predetermined invocation phrase, also referred to herein as "hot word(s)," "wake word(s)," "hot phrase," or "wake phrase." A user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, an event that may invoke automated assistant 120 may include one or more detected visual cues, alone or in combination with oral invocation phrases.

Additionally or alternatively, in some implementations, an event that may invoke automated assistant 120 may include other types of user input, such as long presses on user interface elements (e.g., hardware buttons, soft keys, etc.). Additionally or alternatively, some automated assistants may be invoked in particular contexts, such as upon an application being opened. For example, an application such as a mapping/navigation application may, when launched, invoke an automated assistant. Consequently, when a user opens the mapping/navigation app, e.g., while driving, the user can then issue commands (e.g., "find directions to the nearest coffee shop") without having to take any additional actions. And as will be described in more detail herein, in some implementations, automated assistant 120 may be configured to act upon one or both of pre-event and post-event user utterances, referred to herein as "pre-event input streams" and "post-event input streams."

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize automatic speech recognition ("ASR," also referred to as "speech-to-text," or "STT") to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, the aforementioned visual cue module $112_1$, and/or an invocation module 113. In other implementations, one or more aspects of speech capture module 110, image capture module 111, visual cue module $112_1$, and/or invocation module 113 may be implemented separately from automated assistant client 108, e.g., by one or more cloud-based automated assistant components 119. For example, in FIG. 1, there is also a cloud-based visual cue module $112_2$ that may detect visual cues in image data.

In various implementations, speech capture module 110, which may be implemented using any combination of hardware and software, may interface with hardware such as a microphone 109 or other pressure sensor to capture an audio recording of a user's utterance(s). Various types of processing may be performed on this audio recording for various purposes. In some implementations, speech capture module 110 may include a digital signal processing ("DSP") chip 140. In various implementations, DSP chip 140 may include, for instance, a DSP processor 142 that is configured to perform various DSP-based operations on data, stored in a memory buffer 144. Memory buffer 144 may, in some cases, be alternatively referred to as a "retroactive memory buffer." Memory buffer 144 may store data that is indicative of sound captured by microphone(s) 109. This data may take various forms, such as raw audio data (i.e., a recording of the captured sound), text generated from raw audio by one or more STT components (described below), STT-generated text that has been annotated using natural language processing ("NLP"), and/or data indicative of a speaker's intent. This data buffer 144, which may be a circular memory buffer in some implementations, may be rewritten periodically, e.g., as it fills up with data and/or at other intervals.

In some implementations, image capture module 111, which may be implemented using any combination of hardware or software, may be configured to interface with camera 107 to capture one or more image frames (e.g., digital photographs) that correspond to a field of view of the vision sensor 107.

In various implementations, visual cue module $112_1$ (and/or cloud-based visual cue module $112_2$) may be implemented using any combination of hardware or software, and may be configured to analyze one or more image frames provided by image capture module 111 to detect one or more visual cues captured in and/or across the one or more image frames. Visual cue module $112_1$ may employ a variety of techniques to detect visual cues. For example, visual cue module $112_1$ may use one or more artificial intelligence (or machine learning) models that are trained to generate output indicative of detected user-provided visual cues in image frames.

Speech capture module 110 may be configured to capture a user's speech, e.g., via a microphone 109, as mentioned previously. Additionally or alternatively, in some implementations, speech capture module 110 may include a local STT module $117_1$ that is configured to convert that captured audio to text and/or to other representations or embeddings, e.g., using various STT processing techniques. Additionally or alternatively, in some implementations, speech capture module 110 may include a local text-to-speech ("TTS") module $116_1$ that is configured to convert text to computer-synthesized speech, e.g., using one or more voice synthesizers. However, in some cases, because client device 106 may be relatively constrained in terms of computing resources (e.g., processor cycles, memory, battery, etc.), local STT module $117_1$ may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module $116_2$ and/or a cloud-based STT module $117_2$.

In various implementations, invocation module 113 may be configured to determine whether to invoke automated assistant 120, e.g., based on output provided by speech capture module 110 and/or visual cue module $112_1$ (which in some implementations may be combined with image capture module 111 in a single module). For example, invocation module 113 may determine whether a user's utterance qualifies as an invocation phrase that should initiate a human-to-computer dialog session with automated assistant 120. In some implementations, invocation module 113 may analyze data indicative of the user's utterance, such as an audio recording or a vector of features extracted from the audio recording (e.g., an embedding), alone or in conjunction with one or more visual cues detected by visual cue module $112_1$. In some implementations, a threshold that is employed by invocation module 113 to determine whether to invoke automated assistant 120 in response to a vocal utterance may be lowered when particular visual cues are also detected. Consequently, even when a user provides a vocal utterance that is different from but somewhat phonetically similar to the proper invocation phrase, "OK assistant," that utterance may nonetheless be accepted as a proper invocation when detected in conjunction with a visual cue (e.g., hand waving by the speaker, speaker gazes directly into vision sensor 107, etc.).

In some implementations, one or more on-device invocation models 114 may be used by invocation module 113 to determine whether an utterance and/or visual cue(s) qualify as an invocation. Such an on-device invocation model 113 may be trained to detect variations of hot words/phrases and/or gestures. For example, in some implementations, the on-device invocation model 114 (e.g., one or more neural networks) may be trained using training examples that each include an audio recording (or an extracted feature vector) of an utterance from a user, as well as data indicative of one or more image frames and/or detected visual cues captured contemporaneously with the utterance.

Invocation module 113 also includes a command formulation module 146. Command formulation module 146 may be configured to practice selected aspects of the present disclosure, in cooperation with other aspects of automated assistant 120, to formulate commands for automated assistant 120, and/or determine which portion(s) of captured sound should be interpreted as a user command for automated assistant 120, as opposed to ambient conversation. Data indicative of those portion(s) of captured sound deemed to be a user command can be processed by other automated assistant components (e.g., 116, 117, 122, 135, 124, 126, etc.) so that the user's intent can be properly identified and resolved.

For example, in some implementations, command formulation module 146 may be configured to analyze pre- and post-event input streams stored in memory buffer 144 to formulate a user's command. This enables automated assistant 120 to, among other things, respond to "retroactive" commands stored as pre-event input streams. For example, a user is able to first utter a command or statement, and then utter one or more hot words to invoke automated assistant 120. Automated assistant 120 can "go back in time" in memory buffer 144 to obtain the user's previous utterance, and use that to determine (and resolve) the user's intent. More generally, automated assistant 120, e.g., by way of command formulation module 146, may be configured to determine respective measures of fitness of the pre-event and post-event input streams for triggering responsive action by automated assistant 120. Based on these respective measures of fitness, automated assistant 120 may select all or portion(s) of the pre-event input stream and/or the post-event input stream for additional processing.

TTS module 116, whether local to client device 106 ($116_1$) or cloud-based ($116_2$), may be configured to convert textual data—e.g., natural language responses formulated by automated assistant 120—into computer-generated speech output. Cloud-based TTS module $116_2$ may generate the computer-generated speech output that can be rendered using one or more speakers, and may have more resources at its disposal than local TTS module $116_1$.

STT module 117, whether local to client device 106 ($117_1$) or cloud-based ($117_2$), may be configured to convert audio data captured at microphone 109 into text (or into another form, such as an embedding. This converted data may then be provided to a local intent matcher $135_1$ or a cloud-based intent matcher $135_2$. In some implementations, STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 may include a cloud-based intent matcher $135_2$, the aforementioned cloud-based TTS module $116_2$, the aforementioned cloud-based STT module $117_2$, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud), as indicated at $116_1$, $117_1$, $122_1$, etc.

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Intent matcher 135, whether local to client device 106 ($135_1$) or cloud-based ($135_2$), may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122, and/or a visual cue module 112. For example, local intent matcher $135_1$ includes a local natural language processor $122_1$, and cloud-based intent matcher $135_2$ includes a cloud-based natural language processor $122_2$. In FIG. 1, local visual cue module $112_1$ is depicted separately from local intent matcher $135_1$, but this is not meant to be limiting.

In various implementations, local modules $112_1$, $116_1$, $117_1$, $122_1$, and/or $135_1$ may operate similarly to their cloud-based counterparts $112_2$, $116_2$, $117_2$, $122_2$, and/or $135_2$ except that the cloud-based counterparts $112_2$, $116_2$, $117_2$, $122_2$, and/or $135_2$ may have more resources at their disposal. As will become apparent, utilizing local modules $112_1$, $116_1$, $117_1$, $122_1$, and/or $135_1$ may enhance privacy and/or latency (at least for a smaller number of queries to automated assistant 120), whereas the cloud-based counterparts $112_2$, $116_2$, $117_2$, $122_2$, and/or $135_2$ may enhance responsiveness and/or robustness. When the reference numerals 112, 116, 117, 122, and/or 135 are used herein without specifically referencing the local or cloud version, it should be assumed that the described operation may be performed at either location.

Natural language processor 122, whether local to client device 106 ($122_1$) or cloud-based ($122_2$), may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" Grammars may include commands that may follow a particular command syntax, such as beginning with a verb that acts upon a noun (or pronoun) later in the utterance. In some implementations, known command syntaxes may be used to determine fitness of spoken utterances for triggering responsive action by automated assistant 120.

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules $112_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

In some implementations, automated assistant 120 may serve as an intermediary between users and one or more third party computing services 130 (or "third party agents", or "agents"). These third party computing services 130 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 130. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service, thereby to cause the user's heating to be switched on. The third party service 130 may provide automated assistant 120 with a minimum list of slots that need to be filled in order to fulfill (or "resolve") a command to turn the heating on. In this example, the slots may include the temperature to which the heating is to be set, and a duration for which the heating is to be on. Automated assistant 120 may generate and provide to the user (via client device 106) natural language output that solicits parameters for the slots.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIG. 126, which may generate natural language output based on the fulfillment information. While depicted as part of cloud-based automated assistant components 119, in other implementations, fulfillment module 124 may be configured in whole or in part on client device 106, e.g., as part of automated assistant client 108.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user. While depicted as part of cloud-based automated assistant components 119, in other implementations, natural language generator 126 may be configured in whole or in part on client device 106, e.g., as part of automated assistant client 108.

Command formulation module 146 may formulate commands to trigger responsive action by automated assistant 120 using pre- and/or post-event input streams. For example, in some implementations, command formulation module 146 may determine the fitness of pre- and post-event input streams for triggering responsive action by automated assistant 120, and select one or both for additional processing. In some implementations, each of the streams may be applied as input across one or more machine learning models, such as various flavors of neural networks (e.g., recurrent, feedforward, convolutional), hidden Markov models, etc. These machine learning models may be trained to generate output indicative of the fitness of the input for triggering responsive action.

As one non-limiting example, a machine learning model may be trained using training instances of audio data that are labeled as being (or not being) commands intended to trigger automated assistants to take action. As noted previously, people tend to speak differently when addressing automated assistants, e.g., by more dramatically annunciating, speaking more loudly, speaking more slowly, using less slang, etc. These various speech characteristics may be baked into such a model during training, so that the model, once trained, can accurately predict whether subsequent audio data constitutes a command intended to trigger responsive action by automated assistant 120. In some implementations, similar (or even the same) models may be used by automated assistant 120 to determine whether a user's follow-up utterance issued after automated assistant 120 fully resolves the user's previous utterance should be interpreted as a command or ignored.

In some implementations, both a pre-event input stream and a post-event input stream may be applied across the trained machine learning model (in sequence or otherwise), e.g., by command formulation module 146. To this end, the trained model may be stored locally on client device 106 in some cases. The input stream that generates output most indicative of an intention to trigger responsive action by automated assistant 120 may be selected, e.g., by command formulation module 146, for additional processing. This additional processing may yield the user's actual intent, any necessary parameters (slot values) for fulfilling the intent, and may ultimately lead to the user's intent being resolved, e.g., with appropriate responsive action. Responsive action may include any action performable by automated assistant 120 on behalf of a user, such as providing requested information, operating smart appliances, setting reminders or calendar entries, sending messages, making calls, controlling multimedia playback, ordering goods or services, etc.

Techniques other than trained machine learning models may be used to determine a measure of fitness for triggering responsive action by automated assistant 120. As mentioned previously, commands tend to follow particular command syntaxes, such as beginning with an action verb (e.g., "turn the lights on," "play some Beatles music," etc.). Commonly used commands (or more generally, queries) may be analyzed to learn a variety of grammars as mentioned previously. Additionally or alternatively, grammars may be predefined, e.g., by third parties who implement third party computing service 130. Patterns among these grammars, including common command syntaxes, may be determined and used to analyze particular utterances for fitness to trigger responsive action by automated assistant 120. Additionally or alternatively, input streams (e.g., pre- and post-event) may be compared to known grammars to determine similarity measures. The input stream having the highest similarity measure with one or more grammars may be selected as the input stream to be used to trigger responsive action by automated assistant 120.

Figure 2:
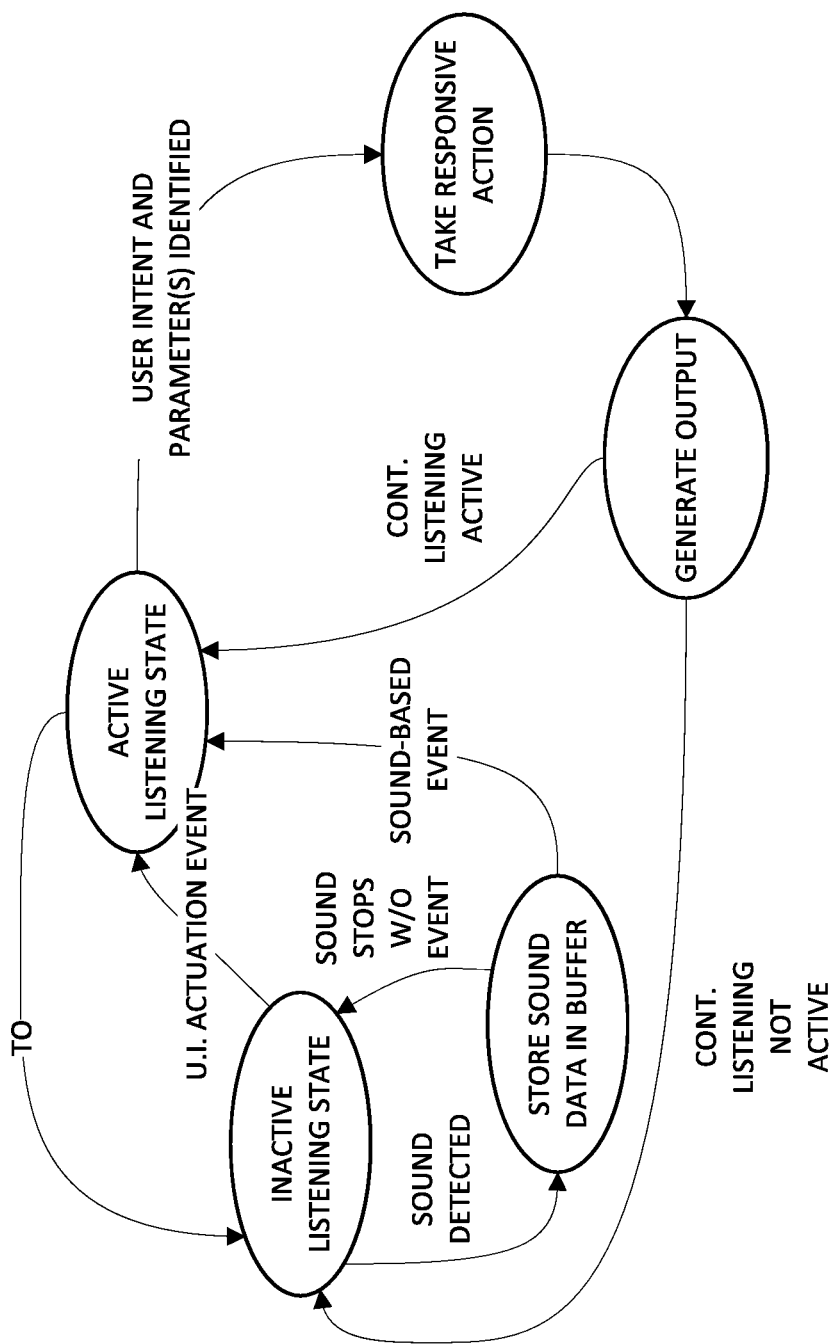
FIG. 2 depicts an example of a state machine that may be implemented by an automated assistant configured with selected aspects of the present disclosure, in accordance with various implementations.

FIG. 2 schematically depicts an example state machine that may be implemented by an automated assistant (e.g., 120) and/or an assistant device (e.g., 106) configured with selected aspects of the present disclosure, in accordance with various implementations. At top left is an "inactive listening state" in which automated assistant 120 may reside when not being engaged by a user. In the inactive listening state, one or more microphones of one or more client devices (106) may be activated, and data indicative of sound captured by the microphone(s) may be at least temporarily stored, e.g., in memory buffer 144, as a "pre-event input stream."

While in the inactive listening state, automated assistant 120 may monitor for one or more events that trigger transition of the automated assistant from the inactive listening state into an active listening state. These events may include, for example, operation of a user interface element (e.g., pressing and holding a particular button), which is referenced in FIG. 2 as "U.I. ACTUATION EVENT." These events additionally or alternatively may include particular contexts, such as launching of a particular application, and/or detection, e.g., by invocation module 113 and/or visual cue module 112, of one or more hot words or phrases, such as "OK, Assistant," "Hey, Assistant," "sleuth that," "remind me," and so forth. In FIG. 2, when a sound is detected while automated assistant 120 is in the inactive listening state, automated assistant may store the sound data in a buffer, such as memory buffer 144. If the sound stops and no sound-based event (e.g., hot word or phrase) is detected, then automated assistant 120 may transition back into the inactive listening state. However, if a sound-based event is detected, then automated assistant 120 may transition into the active listening state.

After detection of the event and transition into the active listening state, first data indicative of sound captured by one or more microphones prior to detection of the event, which as mentioned previously may be temporarily stored in memory buffer 144 as the pre-event input stream, may be obtained. Likewise, automated assistant 120 may obtain, as a "post-event input stream," second data indicative of sound captured by the microphone(s) after detection of the event, if any such data is captured.

While in the active listening state, automated assistant 120 may process the pre-event input stream and the post-event input stream (if available). For example, in some implementations, automated assistant 120 may determine respective measures of fitness of the pre-event and post-event input streams for triggering responsive action. Based on these respective measures of fitness, automated assistant 120 may select the pre-event input stream or post-event input stream.

Automated assistant 120 may determine the speaker's intent and/or any parameters (or slot values) associated with the intent from the selected input stream, and then may transition into a "take responsive action" state. In some implementations, in the "take responsive action" state, fulfillment module 124 may take various actions to perform various responsive tasks, and while doing so may generate fulfillment information as described previously.

After fulfilling the request and generating fulfillment information, automated assistant 120 may transition into the "generate output" state in which natural language generator 126 generates, e.g., based on fulfillment information, natural language output to be provided to the user. In some implementations, automated assistant 120 may have a "continued listening" feature in which automated assistant 120 remains in the active listening state after responding to a user's request. This allows a user to issue a follow up command without having to re-invoke automated assistant 120. If such a feature is available and/or active, automated assistant 120 may transition back to the active listening state. Otherwise automated assistant 120 may transition back to the inactive listening state.

Figure 3:
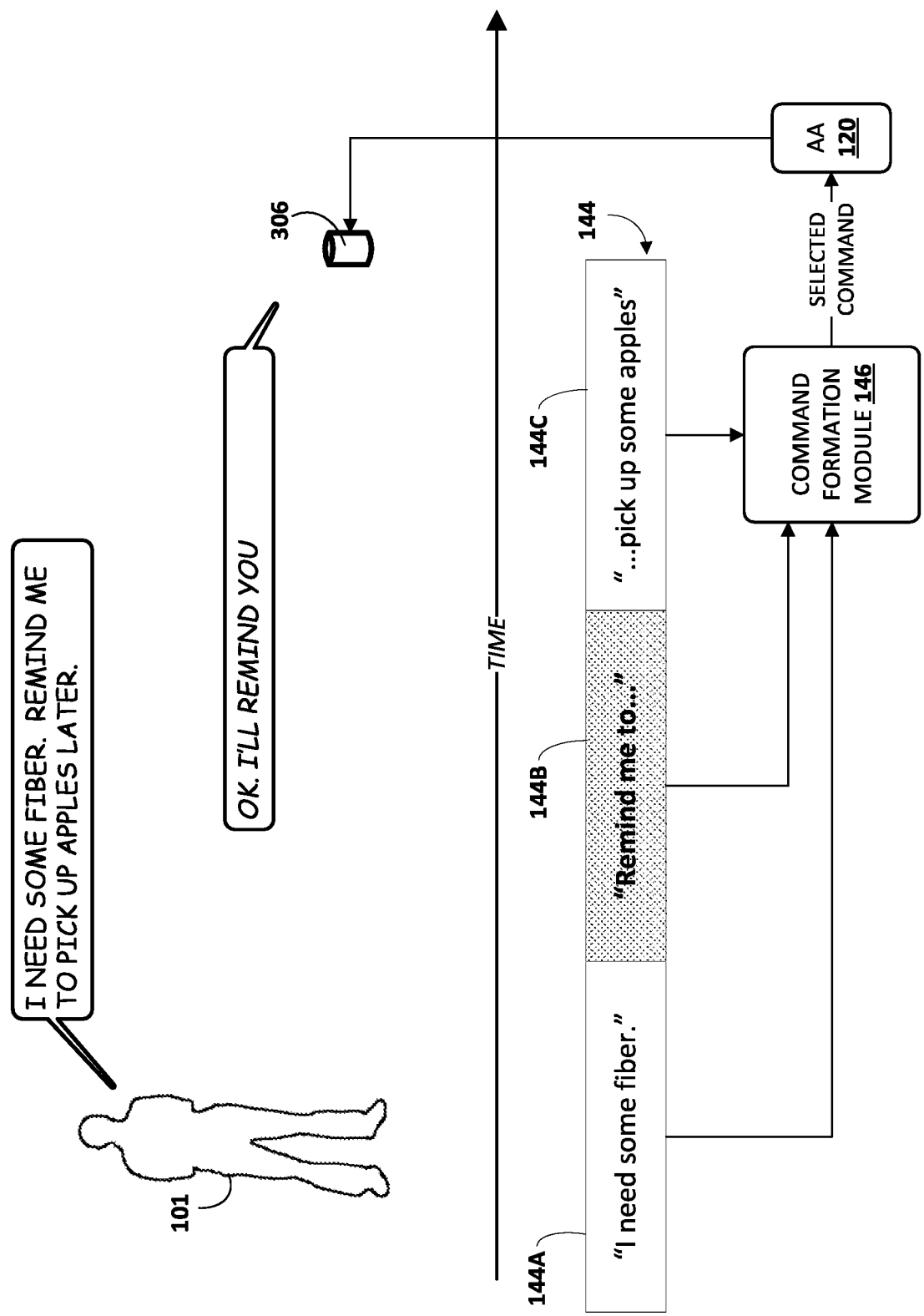
FIGS. 3, 4, 5, 6, 7, 8, 9A, 9B, and 10 schematically depict example scenarios in which disclosed techniques may be employed.

FIG. 3 demonstrates one example of how a human-to-computer dialog session between user 101 and an instance of automated assistant (not depicted in FIG. 3) may occur, via the microphone(s) and speaker(s) of a client computing device 306 (depicted as a standalone interactive speaker but this is not meant to be limiting) according to implementations described herein. One or more aspects of automated assistant 120 may be implemented on the computing device 306 and/or on one or more computing devices that are in network communication with the computing device 306. Memory buffer 144, which may be onboard client device 306, e.g., as part of a DSP, is also depicted at bottom. Data is stored temporally from left to right as indicated by the time arrow, and then overwritten starting at left as memory buffer 144 fills up.

As noted above, automated assistant 120 resides in the inactive listening state until an event is detected. And as is further noted above, when sound is detected while in the inactive listening state, data indicative of sound captured by the microphone(s) is stored at least temporarily in memory buffer 144. In FIG. 3, user 101 provides natural language input of "I need some fiber. Remind me to pick up apples later." In this example, assume the phrase "remind me to" is a hot phrase that, when detected, constitutes an event that will cause automated assistant 120 to transition from the inactive listening state to the active listening state.

Upon this transition, a first portion 144A of memory buffer 144 stores data indicative of a portion of the utterance ("I need some fiber") by user 101 that was captured prior to the event. This data constitutes the pre-event input stream mentioned above. A second portion 144B of the buffer 144 stores data indicative of the portion of the utterance that constitutes the event, "remind me to . . . " A third portion 144C of the buffer 144 stores data indicative of sound captured after detection of the event, " . . . pick up some apples later." This data constitutes the post-event input stream mentioned above.

The pre- and post-event input streams may be provided to command formulation module 146 for processing. Command formulation module 146 may analyze these various streams to determine measures of fitness to trigger responsive action by automated assistant 120. In some implementations the pre- and post-event input streams 144A, 144C may be provided to command formulation module 146 in combination with second portion 144B of buffer 144, e.g., because the uttered hot words that were detected as an event may also influence which input stream (pre- or post-event) is more fit for triggering responsive action from automated assistant 120.

The phrase "pick up some apples later" is more command-like than "I need some fiber," which is simply a declaration. This may be detected by command formulation module 146 in various ways, such as using one or more trained machine learning models as described previously, or by determining that "pick up some apples" is more similar to known command syntaxes than "I need some fiber." In some implementations, command formulation module 146 may also consider the hot word(s) used ("remind me to . . . ") to select one input stream or the other. At any rate, command formulation module 146 may select "pick up some apples" and provide that to one or more other components of automated assistant 120. Automated assistant 120 then responds, "OK, I'll remind you" and sets a reminder, which may be set for some time "later," such as in an hour, when user 101 is on his way home from work, after completion of a scheduled appointment (determined from a calendar of user 101), and so forth.

Figure 4:
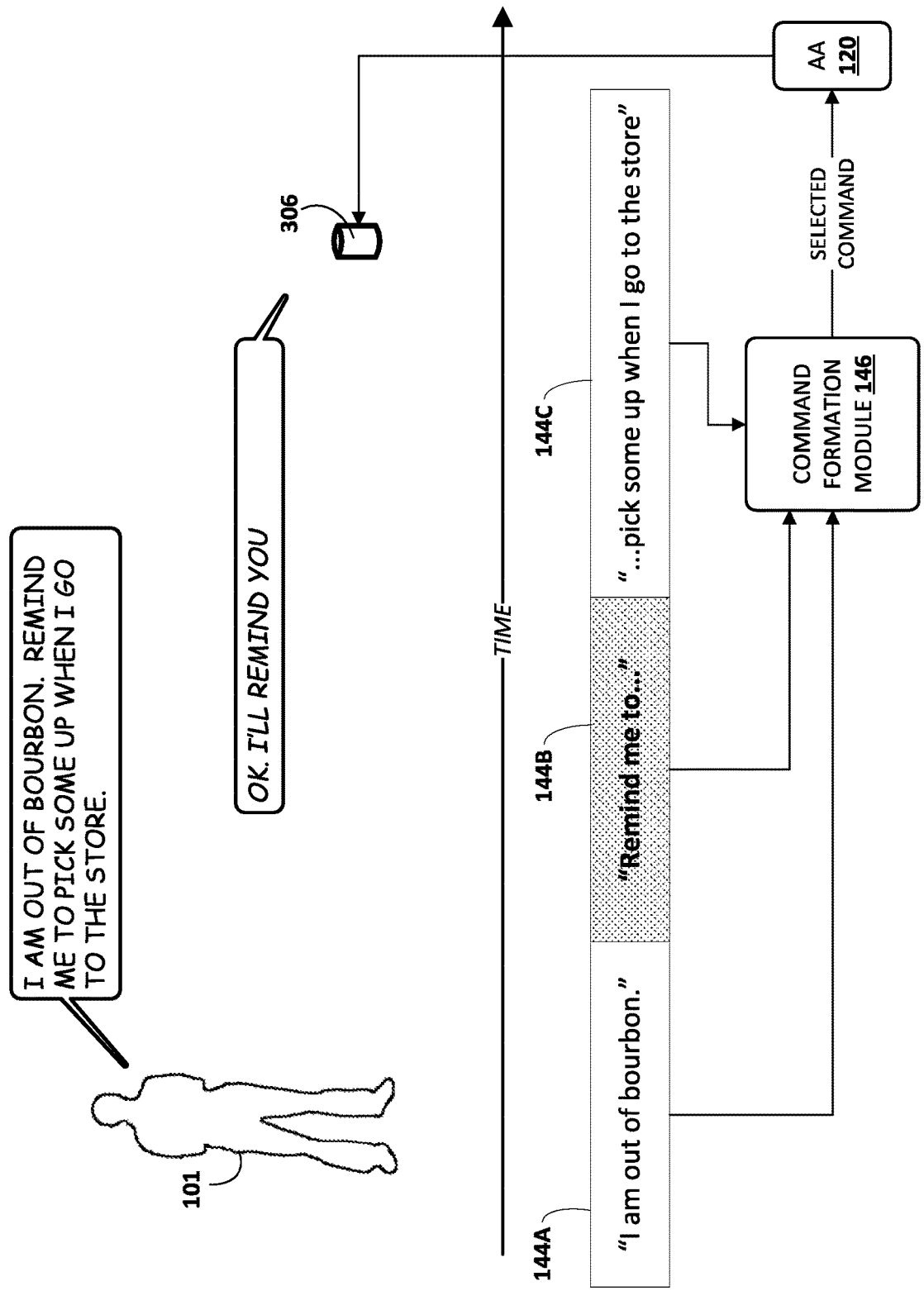

It is not always an either/or choice between the pre-event and post-event input streams. Sometimes one input stream may be more command like, but the other input stream may contain contextual information that is useful or even required for triggering responsive action from automated assistant 120. Referring now to FIG. 4, a scenario is depicted that is similar to that depicted in FIG. 3. In this case, user 101 makes the utterance, "I am out of bourbon. Remind me to pick some up when I go to the store." As was the case in the previous example, the hot word(s) that trigger transition of automated assistant 120 into the active listening state are "remind me to . . . "

However, in this case, neither the pre-event input stream 144A nor the post-event input stream 144C contain sufficient information for automated assistant 120 to take responsive action (by setting a reminder). If only the post-event input stream 144C is considered, then it is unclear what "some" refers to, and automated assistant 120 may have to solicit disambiguating input from user 101. And the pre-event input stream 144A is, like the previous example, more of a declaration than a command.

However, in some implementations, command formulation module 146 may be configured to perform, or enlist other components of automated assistant 120 to perform, various types of natural language processing, such as coreference resolution, to determine that "some" in post-event input stream 144C refers to "bourbon" from pre-event input stream 144A. Accordingly, the command formulated by command formulation module 146 may be something like "Remind me to pick up bourbon when I go to the store." Automated assistant 120 may then set a reminder and provide natural language output, such as "OK. I'll remind you."

Figure 5:
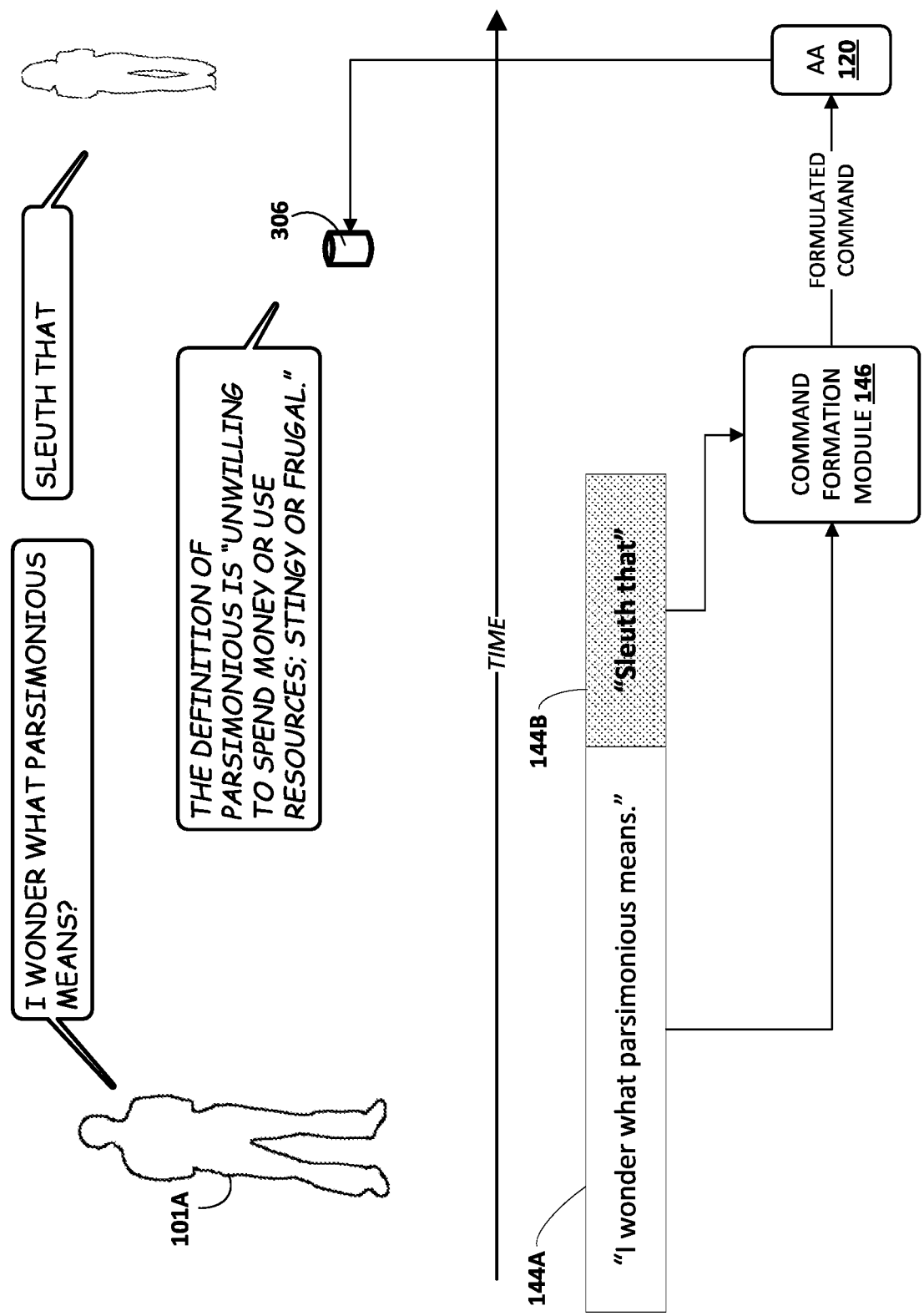

Sometimes there may not be any post-event input stream to analyze. For example, a user may provide an utterance with contextual information, and then retroactively invoke automated assistant 120 solely to process what the user just said. An example of this is depicted in FIG. 5, which includes a first user 101A and a second user 101B engaged in a conversation in an environment in which a client device 306 configured with selected aspects of the present disclosure is located.

First user 101A asks second user 101B, "I wonder what parsimonious means?" Because sound is detected by one or more microphones (not depicted) of client device, automated assistant 120 may transition into the "STORE SOUND DATA IN BUFFER" state of FIG. 2 and store data indicative of this utterance. Next, second user 101B says, "Sleuth that," which in this example operates as hot word(s) that constitute an event to invoke automated assistant 120. The contents of memory buffer 144 are depicted at bottom, with data indicative of "I wonder what parsimonious means?" stored in pre-event input stream 144A, the hot words stored in second portion 144B of memory buffer 144, but with no post-event input stream (because neither user said anything else).

Consequently, command formulation module 146 may formulate a command from the pre-event input stream 144A and the hot word(s). In this example, the hot word(s) themselves are the command, and are ambiguous to the extent they refer to "that." However, a component such as natural language processor 122 can co-reference resolve "that" as referring to "parsimonious" from pre-event input stream 144A. The formulated command is then processed by automated assistant 120 at large, which responds, "The definition of parsimonious is 'unwilling to spend money or use resources; stingy or frugal.'"

In some implementations, signal(s) related to a particular individual's identity may be used, e.g., by command formulation module 146, to determine how to formulate a command. For example, speaker recognition technology may be used to determine a speaker's identity. If the speaker's identity is successfully determined, and/or it is determined that the speaker has sufficient permissions, then certain hot word(s) may become activated and may facilitate performance of techniques described herein. On the other hand, if a speaker is not recognized, in some implementations, that unknown speaker may not be able to take advantage of at least some of the techniques described herein. For example, an unrecognized speaker may not be able to issue retroactive commands as described herein, whereas a recognized (and presumably authorized) speaker may be able to issue retroactive commands. In particular, in some implementations, automated assistant 120 may only transition from the inactive listening state of FIG. 2 to the "STORE SOUND DATA IN BUFFER" state of FIG. 2 if the sound corresponds to a registered user's voice. Otherwise the sound may not be captured at all, or may be discarded from memory immediately after it is determined that the speaker is not recognized.

Figure 6:
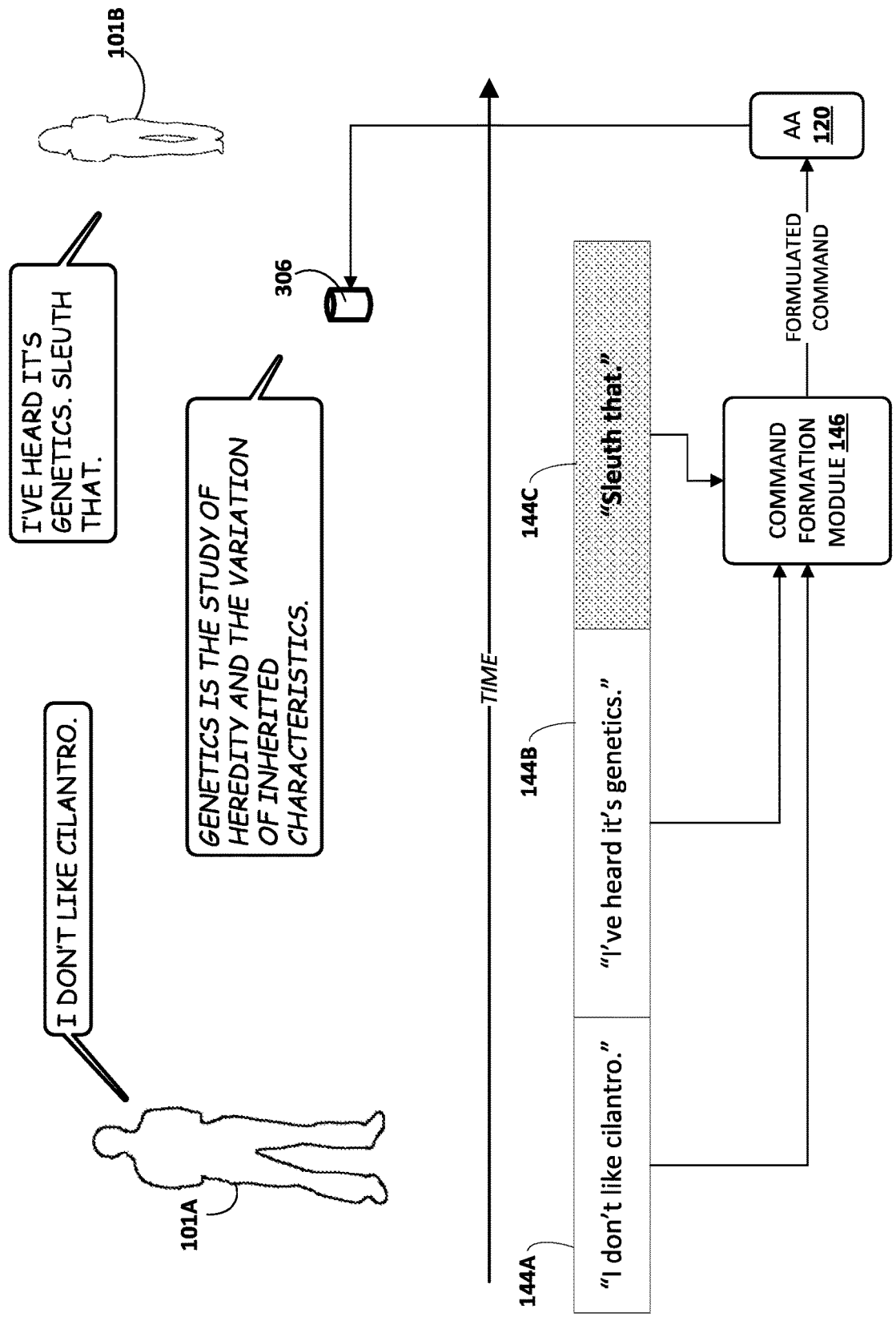
Figure 7:
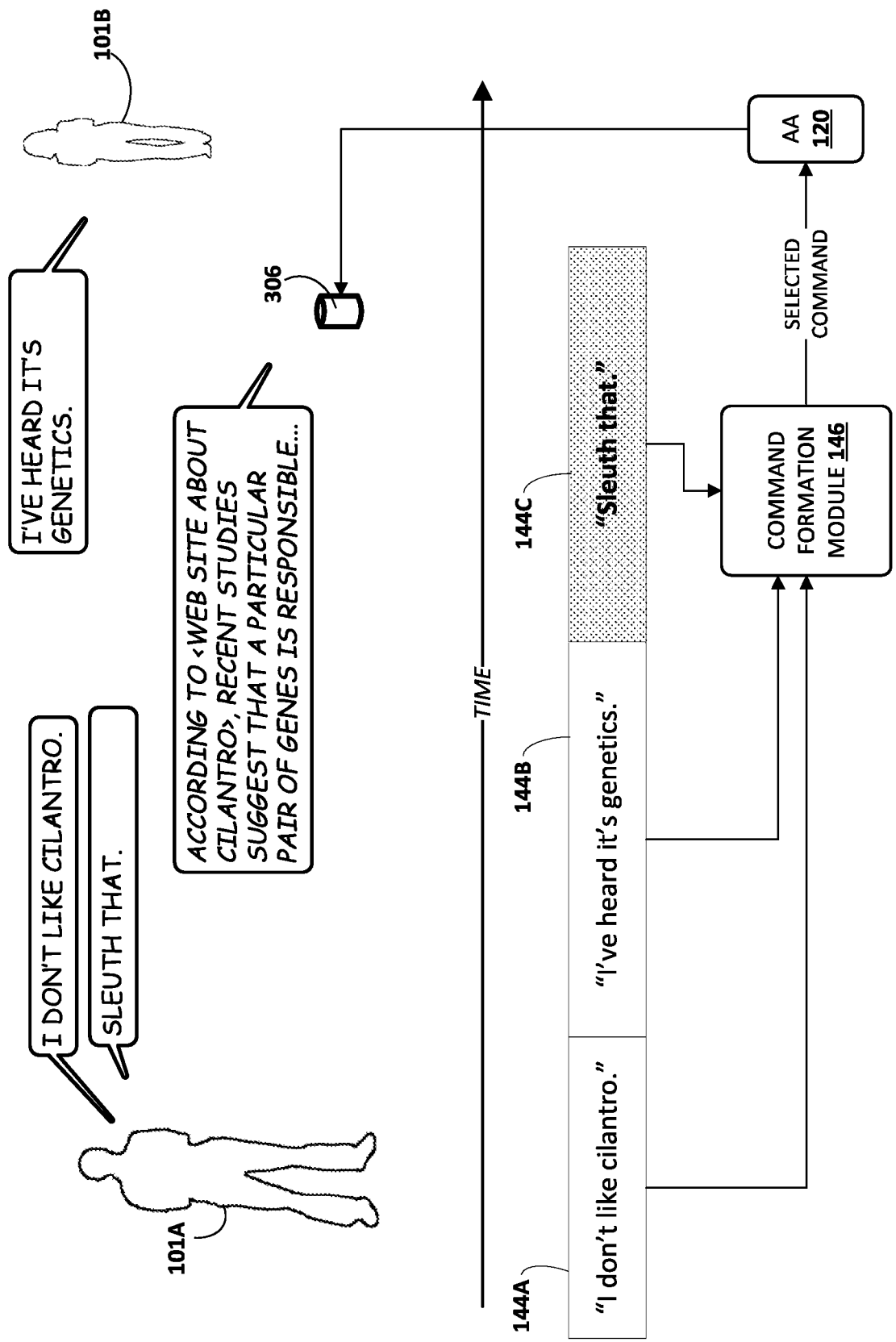

In some implementations, speaker recognition may also be used to determine which of multiple pre-event input streams should be used to trigger responsive action by an automated assistant. One such example is depicted in FIGS. 6 and 7. In FIG. 6, first and second users 101A-B are once again having a conversation. In this example, assume first user 101A is registered with automated assistant 120, and thus automated assistant 120 will recognize the voice of first user 101A. Assume further that second user 101B is unknown to and unregistered with automated assistant 120.

In this example, first user 101A utters "I don't like cilantro." Second user 101B responds, "I heard it's genetics. Sleuth that." "Sleuth that" in this example is a hot phrase that triggers automated assistant 120 to transition from the inactive listening state to the active listening state. This, rather than a pre-event input stream and a post-event input stream being available, there are two distinct pre-event input streams, 144A and 144B, that will be processed by command formulation module 146. As will examples before, the word "that" in the invocation phrase may need to be co-reference resolved. However, it's not entirely clear what it should be resolved to in this example without considering other signals.

In some implementations, in a situation like this, command formulation module 146 may consider a speaker identity when selecting between the two pre-event input streams (or more generally, between any pair of input streams, whether pre- and post-event, or even a pair of two post-event input streams). For example, because second user 101B is the one that invoked automated assistant 120, in some implementations, the input stream that matches her voice may be promoted over the other input stream that matches the different voice of first user 101A. Thus, command formulation module 146 may formulate a command (or more generally, intent) such as "information about genetics." In response, automated assistant 120 provides the natural language output, "Genetics is the study of heredity and the variation of inherited characteristics." This output is tailored only towards the utterances by second user 101B, and was not generated using any information from the utterance of first user 101A.

FIG. 7 depicts a slight variation. In FIG. 7, assume once again that first user 101A is speaker-recognizable by automated assistant 120 as registered user. Now, instead of second user 101B invoking assistant, first user 101A invokes assistant after second user 101B makes her statement, "I've heard it's genetics." Because first user 101A is registered/recognized, command formulation module 146 may, for instance, take into account both pre-event input streams 144A and 144B when formulating a command, or at least may promote the input stream 144A that matches a voice of first user 101A. At any rate, the resulting command (or more generally, intent) may be something like the following search information-seeking query: "dislike of cilantro and genetics." After performing such a search, automated assistant 120 may respond, "According to <web site about cilantro>, recent studies suggest that a particular pair of genes is responsible . . ."

Figure 8:
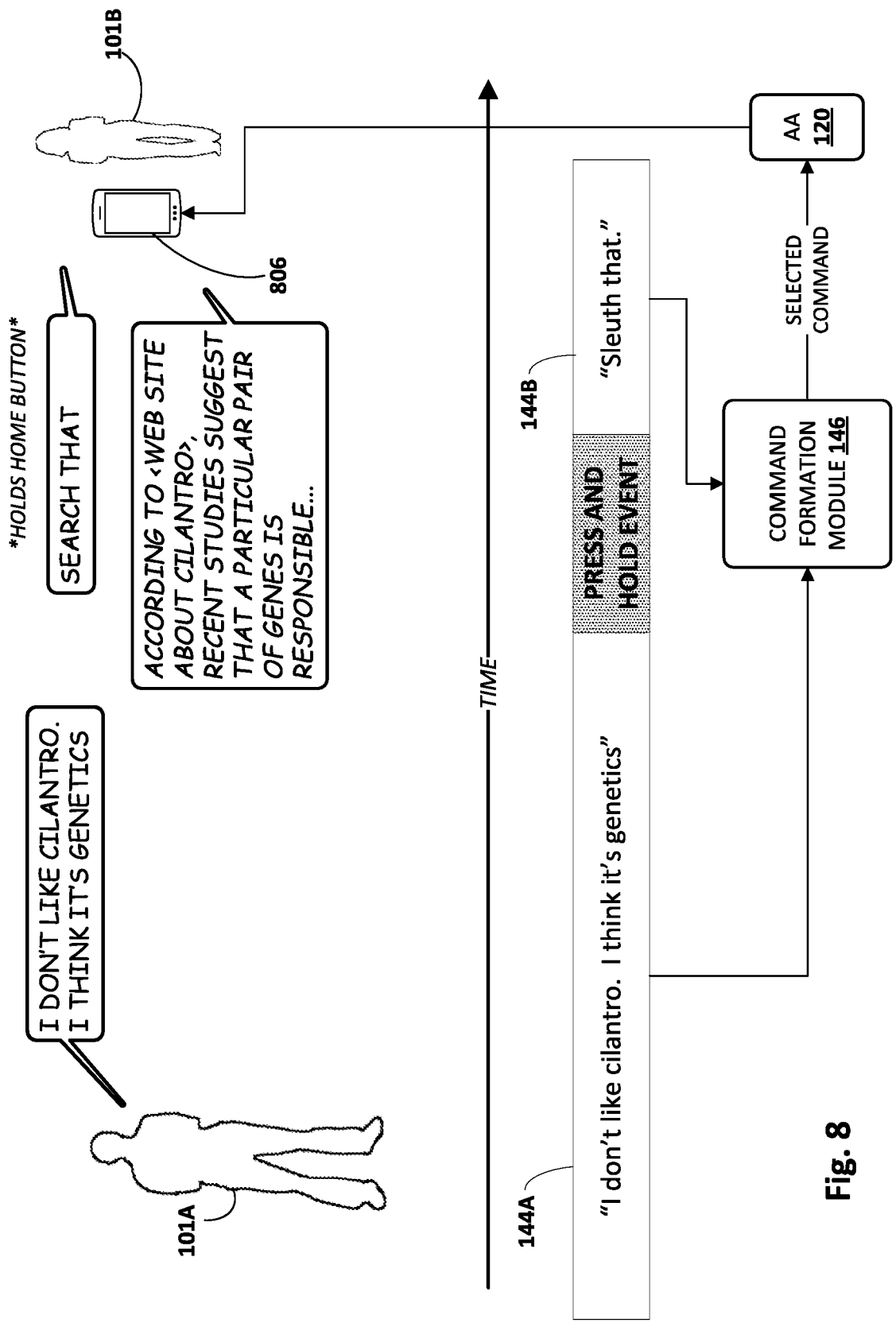

A variation of the situations of FIGS. 6-7 is depicted in FIG. 8 to demonstrate how techniques described herein may be applied when the detected event is something other than hot word(s), such as a button press. Also, in FIG. 8, the users 101A-B interact with automated assistant 120 using a client device 806 in the form of a smart phone carried by second user 101B. In this example, first user 101A says, to second user 101B, "I don't like cilantro. I think it's genetics." Second user 101B then presses and holds a button on smart phone 806 to invoke automated assistant 120 into active listening mode, and then asks automated assistant 120 to "Search that."

The command "Search that" is facially ambiguous because it includes the word "that." However, using techniques described herein, command formulation module 146 is able to analyze pre-event input stream 144A and post-event input stream 144B (here, the event is the button press, which would not require much if any memory from buffer 144) to formulate a command. In this example, the command to be performed is "search," which may simply be an Internet search, or could be a search of one or more other networks, such as one or more intranets of a business. The parameter "that" can be resolved, e.g., by one or more components of natural language processor 122 (e.g., coreference resolver) using pre-event input stream 144B to include terms such as "cilantro," "genetics," "don't like," etc. Consequently, after performing its search (e.g., by way of fulfillment module 124), automated assistant 120 may respond, "According to <web site about cilantro>, recent studies suggest that a particular pair of genes is responsible . . ."

Figure 9A:
Figure 9B:

FIGS. 9A and 9B demonstrate one example of how techniques described herein interplay with "continued listening" functionality in which automated assistant 120 remains in active listening mode for some time interval after fulfilling a user's request, in case the user would like to issue a follow up query without invoking automated assistant 120 first. In this example, user 101 engages automated assistant 120 using a client device 906 in the form of a standalone interactive speaker, but this is not meant to be limiting.

In FIG. 9A, user 101 invokes automated assistant 120 with the hot words, "Hey Assistant," and then asks, "Who directed 'Black Hawk Down'?" Automated assistant 120 performs a search, e.g., of a knowledge graph, to identify the entity "Black Hawk Down" and to determine that it's director was Ridley Scott. Automated assistant 120 then replies, "Ridley Scott directed 'Black Hawk Down' in 2001." User 101 then asks, "I prefer Oliver Stone. How old is he?"

At this point, if the "continued listening" feature is active, then automated assistant 120 may attempt to respond to the request, "How old is he?", which it can be assumed is not a hot phrase that would normally invoke automated assistant. Even though user 101 identified a new entity, Oliver Stone, this new entity may not have been part of any contextual dialog data structure on which automated assistant 120 relies for performing actions such as coreference resolution. By contrast, a search had already been performed in relation to different entities, "Black Hawk Down" and Ridley Scott, and so these other entities may be part of the contextual dialog data structure. Consequently, for the question "How old is he?", automated assistant 120 may resolve "he" to Ridley Scott, not to Oliver Stone (who clearly was the target of the question), and respond, "He is 81 years old," which is correct for Ridley Scott but not for Oliver Stone.

In FIG. 9B the scenario is almost exactly the same. However, rather than asking the generic question, "How old is he?", which was not a hot phrase meant to transition automated assistant 120 into active listening state, user 101 re-invokes automated assistant 120 with the hot word "Sleuth" and the parameters "his age." Now, in addition to entities persisted as part of the existing contextual dialog data structure, automated assistant 120 also has access to the pre-event input stream, which may store the last statement made by user 101 before the hot phrase, "Sleuth his age." Accordingly, command formulation module 146 is able to formulate a command that is properly aligned with the true intent of user 101, and automated assistant 120 replies, "He is 72 years old," the correct age for Oliver Stone.

As noted previously, many aspects of techniques described herein may be performed locally on a client device (e.g., 106, 306, 906), on cloud-based infrastructure (e.g., cloud-based automated assistant components 119), or any combination thereof. Performing operations such as STT and natural language processing locally on a client device may provide the benefit of increased privacy, as data indicative of sound recorded by one or more microphones is less likely to be transmitted to the cloud, especially if the command can be fulfilled entirely on the client device. However, the tradeoff is that client devices are often resource-constrained, at least in relation to cloud-based components. Accordingly, it may be the case that automated assistant 120 cannot respond to every request using only local resources, e.g., if the request is ambiguous, difficult to understand, a "long tail" request, etc.

In some implementations, automated assistant 120 may strike a balance between user privacy and the ability to detect and respond fully to voice-based requests by determining a confidence measure associated with content of the pre-event and/or post-event input streams. This confidence measure may be used, for example, to determine whether to seek confirmation from a user before transmitting data indicated of recorded sound to one or more cloud-based components.

In some implementations, the measure of fitness of an input stream for triggering responsive action by automated assistant 120, which as described above may be used to select and/or formulate commands from multiple input streams (e.g., pre-event, post-event, etc.), may also be used as a confidence measure, or with other data to calculate a confidence measure. Suppose a measure of fitness is stated on a scale from zero to one, with zero indicating totally unfit for triggering automated assistant 120 and one indicating the highest confidence for triggering automated assistant 120. Suppose further that a pre-event input stream has a measure of fitness of 0.4, and a post-event input stream has a measure of fitness of 0.3. The pre-event input stream has a greater measure of fitness than the post-even input stream, and thus is more likely to be selected by command formulation module 146 for additional processing. However, 0.4 may fail to satisfy a confidence threshold that it should be used to trigger automated assistant 120.

This situation may be addressed in various ways. In some implementations, automated assistant 120 may issue natural language output asking the user to confirm whether he or she intended automated assistant 120 to take action on the utterance. Additionally or alternatively, in some implementations, automated assistant 120 may determine whether the content of the pre-input stream can be resolved using only local resources (e.g., STT $117_1$, NLP $222_1$), or whether it will be necessary to utilize any cloud-based resources (e.g., STT $117_2$, NLP $222_2$). If everything can be processed locally and automated assistant 120 can fulfill the request without cloud-based resources, it may simply respond to the request without asking the user first. One the other hand, if automated assistant 120 requires one or more cloud-based resources to resolve the request—meaning at least some data indicative of the user's utterance will be transmitted to the cloud—then automated assistant 120 may ask the user's permission first, or may refrain from responding altogether.

As described previously, in some implementations, any detected sound, or at least sound that is determined to be a voice, may trigger transition of automated assistant 120 into the "STORE SOUND DATA IN BUFFER" state described in FIG. 2. Much of the sound recorded in this state is likely to be ambient sound, such as conversation between two or more individuals, an individual making a phone call, or even background noise such as talk radio or television. In many cases users may consider their conversations to be private, and would prefer that no data indicative thereof be transmitted to the cloud.

To avoid over-triggering of automated assistant 120 in response to such ambient noise, in some implementations, the confidence measure—whether based on the measure of fitness or otherwise—may be compared with various thresholds to determine what action to take, if any. For example, if the confidence measure falls below a first threshold, then no action may be taken on data stored in buffer 144. If the confidence measure falls between the first threshold and a higher second threshold, then automated assistant 120 may seek permission from a user before taking responsive action, e.g., by confirming the user's request. If the confidence measure falls between the second threshold and a third higher threshold, automated assistant 120 may take responsive action if only local resources are required; if cloud-based resources will be required, confirmation may be sought from the user. If the confidence measure falls above the third threshold, automated assistant 120 may take responsive action without needing further input and without regard to whether local or cloud-based resources are required to fulfill the request. In other implementations, other numbers of sub-ranges may be used to determine how automated assistant will respond.

A variety of signals may be taken into account to determine the confidence measure described above (and hence, how/whether to further process content in memory buffer 144). As noted previously, the measures of fitness for triggering responsive action that are used by command formulation module 146 to select from multiple input streams may be used, alone or in combination with other signals. Additionally or alternatively, in some implementations, recognition of the speaker using speaker recognition may be considered. For example, an utterance from the "owner" of an assistant device may be granted a greater (or lesser) confidence measure than someone else—this may prevent voices of people on television/radio from triggering action by automated assistant 120. Additionally or alternatively, an utterance from a registered user of an assistant device may be granted a greater (or lesser) confidence measure than an unregistered user (again, may prevent television/radio utterances from inadvertently triggering automated assistant 120). In some implementations, various attributes of the speaker's voice, such as cadence, clarity, etc., may be considered (e.g., a more clearly articulated statement may receiver a higher confidence measure than a mumbled statement).

One signal that may be weighted particularly heavily when determining the confidence measure is the event itself that invoked automated assistant 120. A user action that unambiguously indicates the user wishes to engage with automated assistant 120 may receive a higher confidence measure than a user action that less clearly signals an intent to engage automated assistant 120. For example, if a user presses a particular button to invoke automated assistant 120, and especially if the user presses and holds the button for some time interval, that may indicate a strong intent to engage automated assistant 120, and hence, a relatively high confidence measure. Or, if the user launches a particular application, and that application is configured so that its launch automatically triggers invocation of automated assistant 120, any utterance captured some time interval after opening the application may yield a relatively high confidence measure.

Similarly, a spoken hot word or phrase may be deemed unambiguous if, for example, it is clearly understood by automated assistant 120 (e.g., STT module 117 assigns a high confidence to the interpretation). In such case, a relatively high confidence measure may be determined, and content of pre-event and/or post-event input streams is highly likely to be used to formulate a command that triggers responsive action by automated assistant 120. A mumbled word or phrase, on the other hand, may receive a low confidence measure, and hence may be less likely to be acted upon by automated assistant 120.

Figure 10:
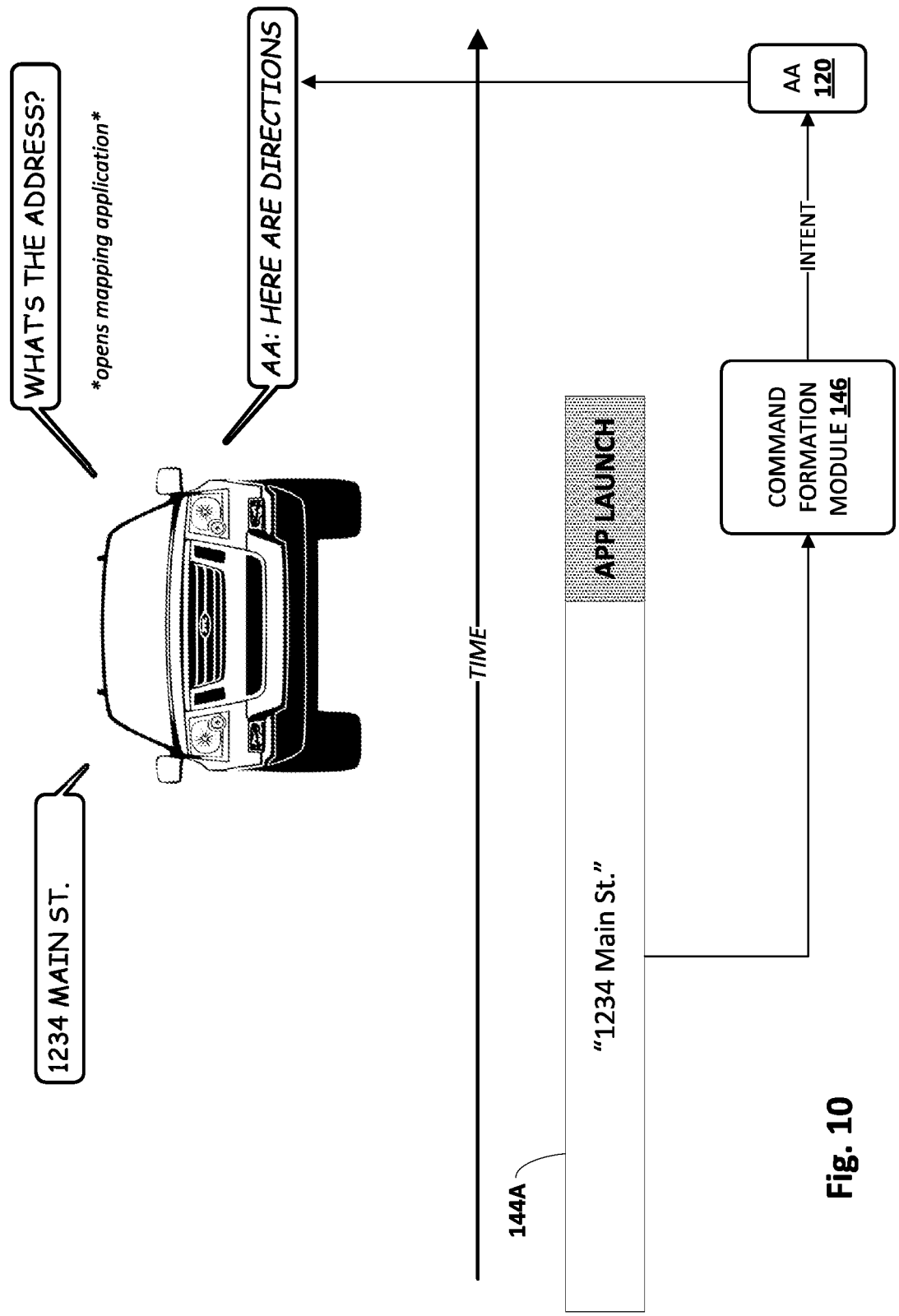

Another example scenario is depicted in FIG. 10 to demonstrate how techniques described herein may be applied when the detected event is context-based, e.g., launching of an application. In FIG. 10, two users are in a vehicle. The driver asks, "What's the address?" The passenger responds, "1234 Main St." The driver then launches a mapping application, e.g., by actuating a button or other interface on a phone or somewhere in the vehicle. In this example, launching of the mapping application constitutes an event that automatically invokes automated assistant 120. Consequently, command formulation module 146 is able to obtain data indicative of the address from the pre-event input stream 144B, and automated assistant 120 is able to proactively provide the directions, e.g., on a screen in the vehicle or on a phone carried by one of the users. As a slight variation, in some implementations, whenever utterances are recorded in buffer 144 and those utterances are found to correspond to addresses, the addresses may be stored for some length of time, e.g., hours, days, etc., in less volatile memory of a client device. When a user launches the mapping application to trigger invocation of automated assistant 120, those addresses may be provided to automated assistant 120 as suggestions, which it may in turn provide to the user as suggested destinations.

Figure 11:
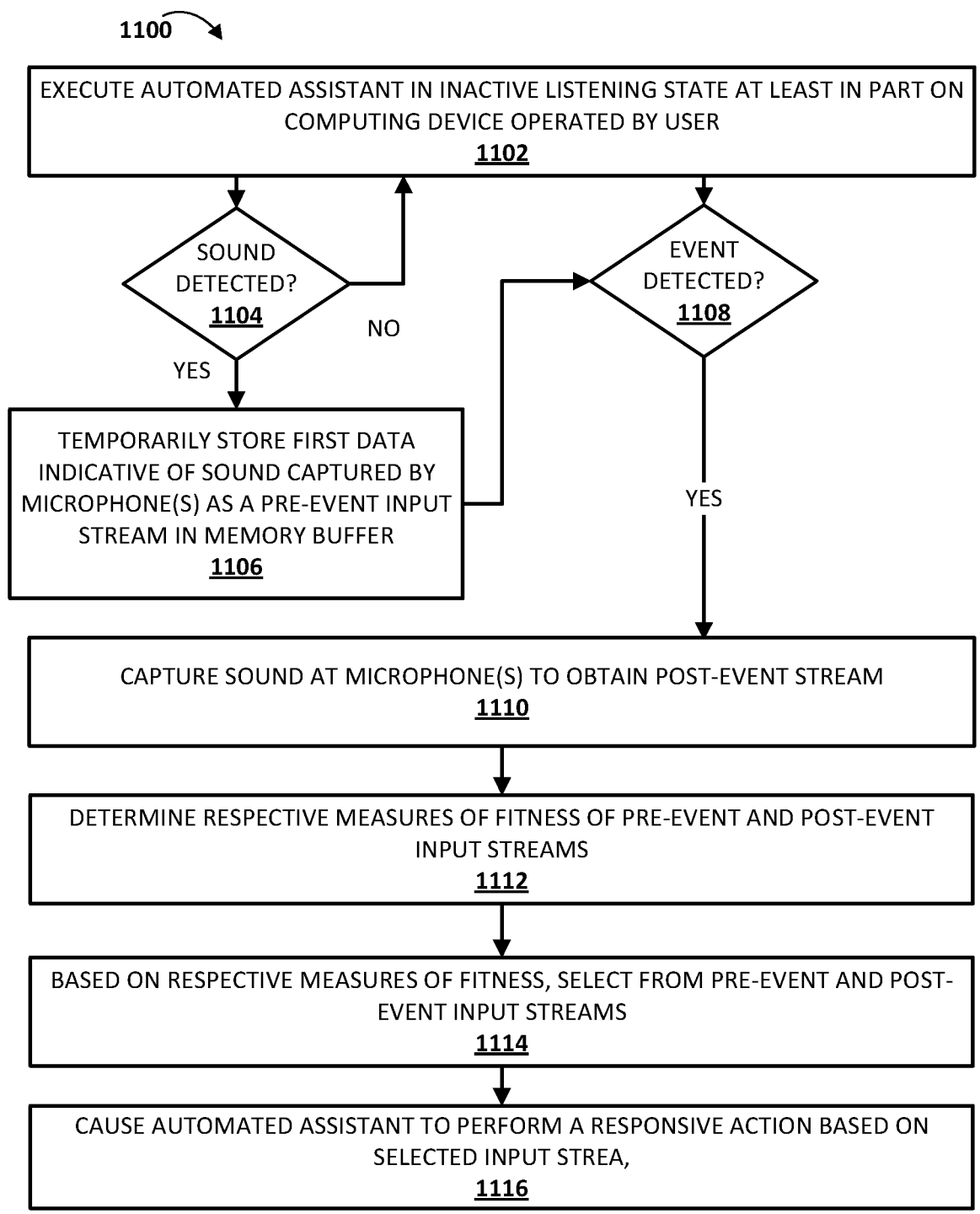
FIG. 11 depicts a flowchart illustrating an example method according to implementations disclosed herein.

FIG. 11 is a flowchart illustrating an example method 1100 according to implementations disclosed herein. For convenience, the operations of the flow chart are described with reference to a system that performs the operations. This system may include various components of various computer systems, such as one or more components of automated assistant 120. Moreover, while operations of method 1100 are shown in a particular order, this is not meant to be limiting. One or more operations may be reordered, omitted or added.

At block 1102, the system may execute automated assistant 120 at least in part on a computing device (e.g., client device 106, 306) in an inactive listening state. For example, and as noted above, in many cases automated assistant 120 may be implemented in part on client device 106 and in part on the cloud (e.g., cloud-based automated assistant components 119). As indicated at block 1104, the system may await the detection of sound while in the inactive listening state. In some implementations, only rudimentary processing may be enabled at this point to preserve battery. For example, a low power DSP may be employed to detect sound, or to detect human voice(s), and wake up other components (e.g., main CPUs or GPUs) upon detection. Also as indicated at block 1108 of FIG. 11, the system may, e.g., in parallel to waiting for sound, await other events as well.

While in the inactive listening state, at block 1104, if sound is detected, method 100 may proceed to block 1106. At block 1106, the system may at least temporarily store first data indicative of sound captured by one or more microphones as a pre-event input stream. For example, and as described previously, this data may be stored in DSP memory buffer 144, which may or may not be a circular buffer that is periodically overwritten, e.g., as it fills with data.

At block 1108, the system may detect an event that triggers transition of the automated assistant from the inactive listening state into an active listening state. If the event was an uttered hot word or phrase, then the audio data that included that hot word/phrase may have been captured at block 1106, and analysis of that data may have detected the hot word/phrase, which as indicated in FIG. 11 leads to block 1108. Otherwise, a user action such as a particular button press, or press and hold, may constitute an event that leads to block 1108.

However the event was detected, at block 1110, the system may obtain, e.g., as a post-event input stream, second data indicative of sound captured by one or more of the microphones after detecting the event. At block 1112, the system may determine respective measures of fitness of the pre-event and post-event input streams for triggering responsive action by the automated assistant.

At block 1114, the system may, based on the respective measures of fitness, select the pre-event input stream or post-event input stream for additional processing. Additionally or alternatively, the system may select content from both input streams to formulate a command. For example, and as described previously, the content of one of the pre- or post-event input streams may be used to coreference resolve an ambiguous term(s) from the other of the pre- or post-event input streams. At block 1016, the system may cause automated assistant 120 to perform one or more responsive actions based on the selected input stream.

Figure 12:
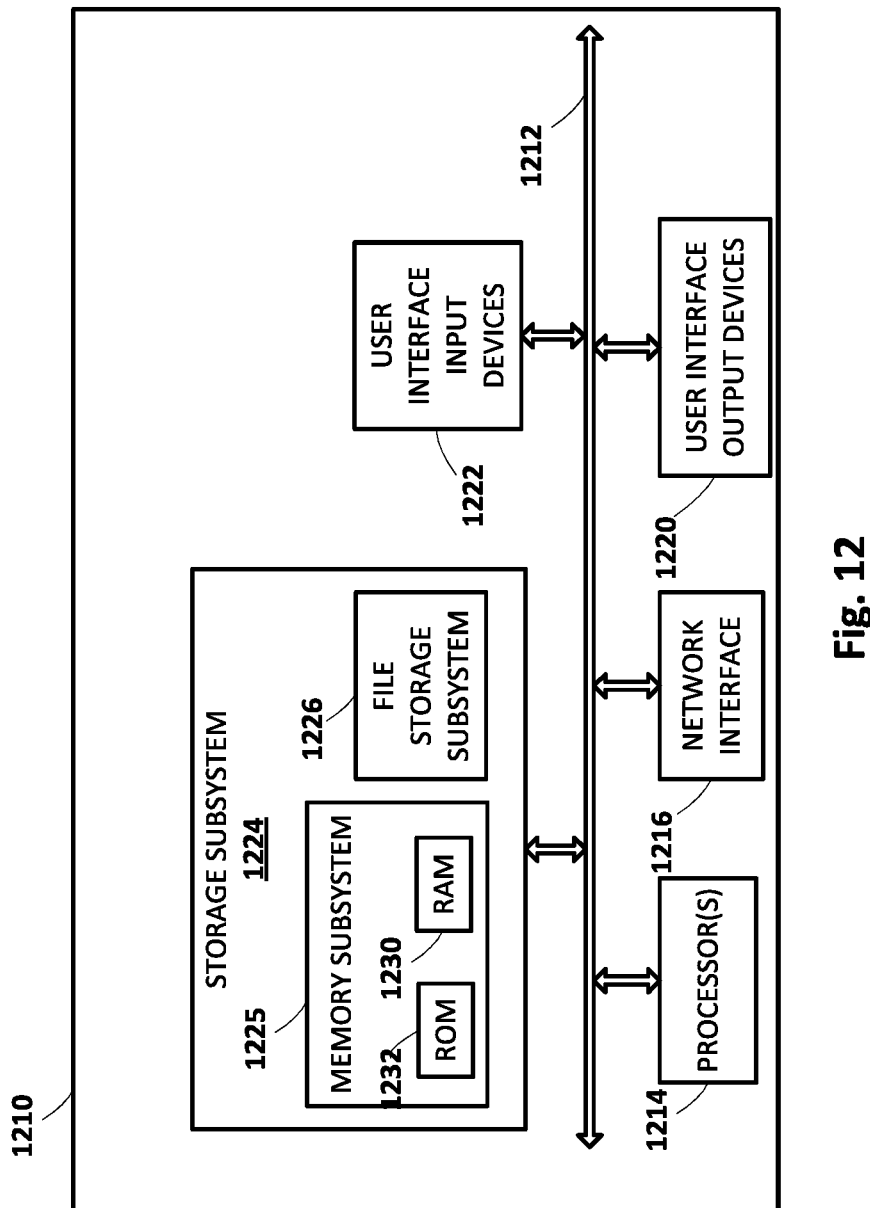
FIG. 12 illustrates an example architecture of a computing device.

FIG. 12 is a block diagram of an example computing device 1210 that may optionally be utilized to perform one or more aspects of techniques described herein. In some implementations, one or more of a client computing device, user-controlled resources engine 134, and/or other component(s) may comprise one or more components of the example computing device 1210.

Computing device 1210 typically includes at least one processor 1214 which communicates with a number of peripheral devices via bus subsystem 1212. These peripheral devices may include a storage subsystem 1224, including, for example, a memory subsystem 1225 and a file storage subsystem 1226, user interface output devices 1220, user interface input devices 1222, and a network interface subsystem 1216. The input and output devices allow user interaction with computing device 1210. Network interface subsystem 1216 provides an interface to outside networks and is coupled to corresponding interface devices in other computing devices.

User interface input devices 1222 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1210 or onto a communication network.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1210 to the user or to another machine or computing device.

Storage subsystem 1224 stores programming and data constructs that provide the functionality of some or all of the modules described herein. For example, the storage subsystem 1224 may include the logic to perform selected aspects of the method of FIG. 7, as well as to implement various components depicted in FIG. 1.

These software modules are generally executed by processor 1214 alone or in combination with other processors. Memory 1225 used in the storage subsystem 1224 can include a number of memories including a main random access memory (RAM) 1230 for storage of instructions and data during program execution and a read only memory (ROM) 1232 in which fixed instructions are stored. A file storage subsystem 1226 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1226 in the storage subsystem 1224, or in other machines accessible by the processor(s) 1214.

Bus subsystem 1212 provides a mechanism for letting the various components and subsystems of computing device 1210 communicate with each other as intended. Although bus subsystem 1212 is shown schematically as a single bus, alternative implementations of the bus subsystem may use multiple busses.

Computing device 1210 can be of varying types including a workstation, server, computing cluster, blade server, server farm, or any other data processing system or computing device. Due to the ever-changing nature of computers and networks, the description of computing device 1210 depicted in FIG. 12 is intended only as a specific example for purposes of illustrating some implementations. Many other configurations of computing device 1210 are possible having more or fewer components than the computing device depicted in FIG. 12.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   executing an automated assistant in an inactive listening state at least in part on a computing device operated by a user;
   while in the inactive listening state, and prior to detecting one or more hot words that trigger transition of the automated assistant from the inactive listening state into an active listening state:
      capturing, at a microphone of the computing device operated by the user, and temporarily storing in a memory buffer of the computing device operated by the user, as a pre-event input stream, first audio data containing a first utterance spoken by the user, and
      capturing, at a vision sensor of the computing device operated by the user, while the user speaks the first utterance, a first set of one or more image frames;
   detecting the one or more hot words in a second utterance spoken by the user subsequent to the first utterance;
   subsequent to detecting the one or more hot words in the second utterance:
      capturing, at the microphone as a post-event input stream, second audio data containing a third utterance spoken by the user subsequent to the second utterance;
      capturing, at the vision sensor, while the user speaks the third utterance, a second set of one or more image frames;
   analyzing the first and second sets of one or more image frames to identify one or more visual cues;
   based on the analyzing, determining respective measures of fitness of the pre-event and post-event input streams for triggering responsive action by the automated assistant;
   based on the respective measures of fitness, selecting an input stream from a set of the pre-event input stream and the post-event input stream for fulfillment by the automated assistant; and
   causing the automated assistant to perform one or more responsive actions based on a command associated with the selected input stream.

2. The method of claim 1, further comprising performing speaker recognition processing on at least a portion of the audio data captured by the microphone to determine an identity of the user, wherein the respective measures of fitness are determined further based on the speaker recognition.

3. The method of claim 2, wherein the respective measures of fitness are determined based on the identity of the user matching an owner of the computing device.

4. The method of claim 1, wherein the detecting is performed using a digital signal processor integral with the computing device operated by the user.

5. The method of claim 4, wherein the digital signal processor is integral with a digital signal processing chip, and wherein the memory buffer comprises a digital signal processing buffer onboard the digital signal processing chip.

6. The method of claim 1, wherein the memory buffer comprises a circular memory buffer that is periodically overwritten by newly captured audio data.

7. The method of claim 1, wherein the memory buffer is configured to temporarily store audio data captured over a predetermined time interval.

8. The method of claim 1, wherein one or more of the responsive actions comprises formulating, and submitting to a search engine, a search query that contains one or more tokens from the selected input stream;
   providing output that conveys content responsive to the search query.

9. The method of claim 1, wherein one or more of the responsive actions comprises operating a smart appliance.

10. A system comprising one or more processors and memory storing instructions that, in response to execution of the instructions by the one or more processors, cause the one or more processors to perform the following operations:
   execute an automated assistant in an inactive listening state at least in part on a computing device operated by a user;
   while in the inactive listening state, and prior to detecting one or more hot words that trigger transition of the automated assistant from the inactive listening state into an active listening state:
      capture, at a microphone of the computing device operated by the user, and temporarily storing in a memory buffer of the computing device operated by the user, as a pre-event input stream, first audio data containing a first utterance spoken by the user, and capture, at a vision sensor of the computing device operated by the user, while the user speaks the first utterance, a first set of one or more image frames;

detect the one or more hot words in a second utterance spoken by the user subsequent to the first utterance;

subsequent to detection of the one or more hot words in the second utterance:

capture, at the microphone as a post-event input stream, second audio data containing a third utterance spoken by the user subsequent to the second utterance;

capture, at the vision sensor, while the user speaks the third utterance, a second set of one or more image frames;

analyze the first and second sets of one or more image frames to identify one or more visual cues;

based on the identified one or more visual cues, determine respective measures of fitness of the pre-event and post-event input streams for triggering responsive action by the automated assistant;

based on the respective measures of fitness, select an input stream from a set of the pre-event input stream and the post-event input stream for fulfillment by the automated assistant; and cause the automated assistant to perform one or more responsive actions based on a command associated with the selected input stream.

11. The system of claim 10, further comprising instructions to perform speaker recognition processing on at least a portion of the audio data captured by the microphone to determine an identity of the user, wherein the respective measures of fitness are determined further based on the speaker recognition.

12. The system of claim 11, wherein the respective measures of fitness are determined based on the identity of the user matching an owner of the computing device.

13. The system of claim 10, wherein the one or more hot words are detected using a digital signal processor integral with the computing device operated by the user.

14. The system of claim 13, wherein the digital signal processor is integral with a digital signal processing chip, and wherein the memory buffer comprises a digital signal processing buffer onboard the digital signal processing chip.

15. The system of claim 10, wherein the memory buffer comprises a circular memory buffer that is periodically overwritten by newly captured audio data.

16. The system of claim 10, wherein the memory buffer is configured to temporarily store audio data captured over a predetermined time interval.

17. At least one non-transitory computer-readable medium comprising instructions that, in response to execution of the instructions by one or more processors, cause the one or more processors to perform the following operations:

execute an automated assistant in an inactive listening state at least in part on a computing device operated by a user;

while in the inactive listening state, and prior to detecting one or more hot words that trigger transition of the automated assistant from the inactive listening state into an active listening state:

capture, at a microphone of the computing device operated by the user, and temporarily storing in a memory buffer of the computing device operated by the user, as a pre-event input stream, first audio data containing a first utterance spoken by the user, and capture, at a vision sensor of the computing device operated by the user, while the user speaks the first utterance, a first set of one or more image frames;

detect the one or more hot words in a second utterance spoken by the user subsequent to the first utterance;

subsequent to detection of the one or more hot words in the second utterance:

capture, at the microphone as a post-event input stream, second audio data containing a third utterance spoken by the user subsequent to the second utterance;

capture, at the vision sensor, while the user speaks the third utterance, a second set of one or more image frames;

analyze the first and second sets of one or more image frames to identify one or more visual cues;

based on the identified one or more visual cues, determine respective measures of fitness of the pre-event and post-event input streams for triggering responsive action by the automated assistant;

based on the respective measures of fitness, select an input stream from a set of the pre-event input stream and the post-event input stream for fulfillment by the automated assistant; and cause the automated assistant to perform one or more responsive actions based on a command associated with the selected input stream.

18. The at least one non-transitory computer-readable medium of claim 17, further comprising instructions to perform speaker recognition processing on at least a portion of the audio data captured by the microphone to determine an identity of the user, wherein the respective measures of fitness are determined further based on the speaker recognition.

19. The at least one non-transitory computer-readable medium of claim 18, wherein the respective measures of fitness are determined based on the identity of the user matching an owner of the computing device.

20. The at least one non-transitory computer-readable medium of claim 17, wherein the one or more hot words are detected using a digital signal processor integral with the computing device operated by the user.

* * * * *